(12) United States Patent
Lin et al.

(10) Patent No.: US 10,349,079 B2
(45) Date of Patent: Jul. 9, 2019

(54) VIDEO IMAGE ENCODING METHOD, VIDEO IMAGE DECODING METHOD, ENCODING DEVICE, AND DECODING DEVICE

(71) Applicant: Huawei Technologies Co., Ltd., Shenzhen (CN)

(72) Inventors: Sixin Lin, Shenzhen (CN); Huanbang Chen, Guangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 15/678,635

(22) Filed: Aug. 16, 2017

(65) Prior Publication Data
US 2017/0347116 A1 Nov. 30, 2017

Related U.S. Application Data

(63) Continuation of application No. PCT/CN2015/086724, filed on Aug. 12, 2015.

(30) Foreign Application Priority Data

Feb. 16, 2015 (CN) .......................... 2015 1 0085362

(51) Int. Cl.
*H04N 19/56* (2014.01)
*H04N 19/52* (2014.01)
(Continued)

(52) U.S. Cl.
CPC ........... *H04N 19/52* (2014.11); *H04N 19/124* (2014.11); *H04N 19/157* (2014.11);
(Continued)

(58) Field of Classification Search
CPC ...... H04N 19/52; H04N 19/56; H04N 19/157; H04N 19/176; H04N 19/196; H04N 19/513; H04N 19/124
See application file for complete search history.

(56) References Cited

U.S. PATENT DOCUMENTS

2002/0034250 A1 3/2002 Yoo
2004/0076233 A1 4/2004 Yoo
(Continued)

FOREIGN PATENT DOCUMENTS

CN 1325220 A 12/2001
CN 1917642 A 2/2007
(Continued)

OTHER PUBLICATIONS

Dong, "Research on the Motion Estimation and Transform Based on the H.264 Framework," Dissertation, Huazhong University of Science and Technology, Wuhan, China (Jul. 2006).
(Continued)

*Primary Examiner* — Howard D Brown, Jr.
(74) *Attorney, Agent, or Firm* — Leydig, Voit & Mayer, Ltd.

(57) ABSTRACT

Embodiments of the present application relate to a video image encoding method, a video image decoding method, an encoding device, and a decoding device. The method includes: determining a motion vector group of a current encoding block; determining prediction values of a first component set of a motion model initialization vector; determining values of the first component set according to the prediction values of the first component set; and encoding the values of the first component set, and transmitting encoded values of the first component set. According to the video image encoding method in the embodiments of the present application, a motion model initialization vector is determined according to a motion vector group; values of a
(Continued)

motion model are determined according to the motion model initialization vector. In this way, a volume of data and a quantity of occupied bits in encoding and decoding transmission can be reduced.

20 Claims, 5 Drawing Sheets

(51) Int. Cl.
    *H04N 19/513* (2014.01)
    *H04N 19/124* (2014.01)
    *H04N 19/176* (2014.01)
    *H04N 19/196* (2014.01)
    *H04N 19/157* (2014.01)

(52) U.S. Cl.
    CPC ......... *H04N 19/176* (2014.11); *H04N 19/196* (2014.11); *H04N 19/513* (2014.11); *H04N 19/56* (2014.11)

(56) References Cited

U.S. PATENT DOCUMENTS

| | | | |
|---|---|---|---|
| 2004/0151245 A1 | 8/2004 | Lainema et al. | |
| 2005/0254581 A1* | 11/2005 | Iguchi | H04N 19/533 375/240.12 |
| 2007/0041445 A1 | 2/2007 | Chen et al. | |
| 2007/0071100 A1 | 3/2007 | Shi et al. | |
| 2007/0217512 A1* | 9/2007 | Matsuda | H04N 19/105 375/240.16 |
| 2008/0159401 A1 | 7/2008 | Lee et al. | |
| 2008/0165856 A1* | 7/2008 | Suzuki | H04N 19/56 375/240.16 |
| 2012/0134419 A1 | 5/2012 | Pateux et al. | |
| 2012/0201293 A1 | 8/2012 | Guo et al. | |
| 2013/0114686 A1 | 5/2013 | Misra et al. | |
| 2014/0105302 A1* | 4/2014 | Takehara | H04N 19/105 375/240.15 |
| 2014/0153647 A1* | 6/2014 | Nakamura | H04N 19/52 375/240.14 |
| 2014/0153840 A1 | 6/2014 | Chiao et al. | |
| 2014/0254687 A1 | 9/2014 | Kondo | |
| 2014/0294078 A1 | 10/2014 | Seregin et al. | |
| 2017/0118525 A1 | 4/2017 | Song et al. | |
| 2018/0070105 A1* | 3/2018 | Jin | H04N 19/577 |

FOREIGN PATENT DOCUMENTS

| | | |
|---|---|---|
| CN | 102595110 A | 7/2012 |
| CN | 102687511 A | 9/2012 |
| CN | 103079070 A | 5/2013 |
| CN | 103329537 A | 9/2013 |
| CN | 104661031 A | 5/2015 |
| EP | 1158806 A1 | 11/2001 |
| EP | 2252066 A2 | 11/2010 |
| EP | 2683165 A1 | 1/2014 |
| JP | 2001339730 A | 12/2001 |
| JP | 2013098899 A | 5/2013 |
| KR | 20010107503 A | 12/2001 |
| KR | 20140124920 A | 10/2014 |
| RU | 2012101686 A | 7/2013 |
| WO | 0154417 A1 | 7/2001 |
| WO | 2004044842 A2 | 5/2004 |
| WO | 2011013253 A1 | 2/2011 |

OTHER PUBLICATIONS

Narroschke et al., "Extending HEVC by an affine motion model," IEEE Picture Coding Symposium, pp. 321-324, Institute of Electrical and Electronics Engineers, New York, New York (2013).
Huang et al., "Affine Skip and Direct Modes for Efficient Video Coding," 2012 IEEE Visual Communications and Image Processing (VCIP), pp. 1-6, XP032309255, Institute of Electrical and Electronics Engineers, New York, New York (Nov. 27-30, 2012).
Bross et al., "Inter-Picture Prediction in HEVC," High Efficiency Video Coding (HEVC): Algorithms and Architectures, pp. 113-140. XP055381060, Springer International Publishing, Switzerland (First Online: Jun. 26, 2014).
Huang et al., "Control-Point Representation and Differential Coding Affine-Motion Compensation," IEEE Transactions on Circuits and Systems for Video Technology, pp. 1651-1660, Institute of Electrical and Electronics Engineers, New York, New York (Oct. 2013).
Lin, et al., "Improved Advanced Motion Vector Prediction," Joint Collaborative Team on Video Coding (JCT-VC) of ITU-T SG16 WP3 and ISO/IEC JTC1/SC29/WG11, Daegu, South Korea, JCTVC-D125, International Telecommunications Union, Geneva, Switzerland (Jan. 20-28, 2011).

* cited by examiner

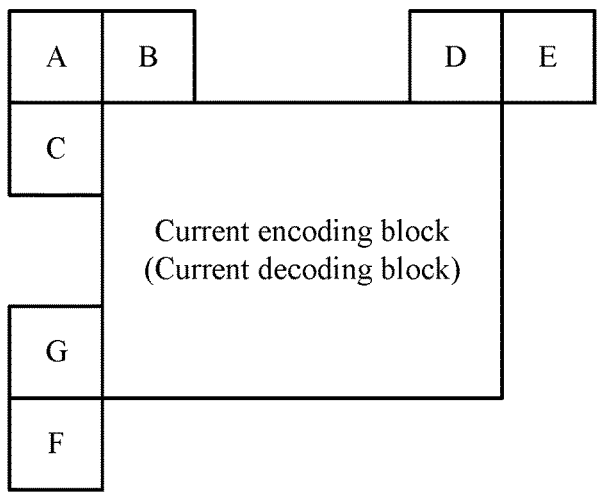

Determine a motion vector group and a motion model transmission vector of a current decoding block according to a bitstream, where the motion vector group includes at least one motion vector of the current decoding block, and the motion model transmission vector includes at least four components ~S210

Determine prediction values of a first component set of a motion model initialization vector of the current decoding block according to the at least one motion vector of the motion vector group, where the motion model initialization vector includes at least four components ~S220

Determine a motion model optimization vector of the current decoding block according to the prediction values of the first component set and the motion model transmission vector, so as to decode the current decoding block according to the motion model optimization vector ~S230

FIG. 3

VIDEO IMAGE ENCODING METHOD, VIDEO IMAGE DECODING METHOD, ENCODING DEVICE, AND DECODING DEVICE

CROSS-REFERENCE TO RELATED APPLICATIONS

This application is a continuation of International Application No. PCT/CN2015/086724, filed on Aug. 12, 2015, which claims priority to Chinese Patent Application No. 201510085362.X, filed on Feb. 16, 2015. The disclosures of the aforementioned applications are hereby incorporated by reference in their entireties.

TECHNICAL FIELD

The embodiments of the present application relates to the field of video image processing, and in particular, to a video image encoding method, a video image decoding method, an encoding device, and a decoding device.

BACKGROUND

In various video codecs, motion estimation/motion compensation is a key technology that affects encoding performance. In existing various video codecs, assuming that an object always holds a translation motion, and that all parts of the entire object move in a same direction and at a same speed, a block-based motion compensation technique is used. However, all these methods are based on a translational motion model, and are improvements made based on a block-based motion compensation method. In the real world, motions are diversified. Irregular motions such as an affine motion, scaling, rotation, and shearing are universal. Existence of these motions spoils motion prediction effects of block-based motion compensation. Since the 1990s, video encoding experts realized that irregular motions are universal, and introduced an irregular-motion model, such as an affine motion model, to improve video encoding efficiency.

In the conventional art, an affine motion model is used for encoding. According to a rate-distortion optimization principle, Lagrangian costs in using the affine parameter model for encoding a current block may be compared with costs in using another model in an encoder. If the costs in encoding by using the affine parameter model are less than the costs in another encoding model, the affine parameter model is finally selected for encoding the current block. A quantized affine model parameter is encoded into a bitstream, so that a decoder can use the parameter to reconstruct the current block. However, in the conventional art, a six-parameter affine motion parameter model needs to be used, that is, additional bits in each block are required to encode six affine motion model parameters. This restricts further improvements of encoding efficiency.

SUMMARY

The embodiments of the present application provide a video image encoding method, a video image decoding method, an encoding device, and a decoding device, to improve encoding and decoding efficiency.

According to a first aspect, a video image encoding method is provided, where the method includes: determining a motion vector group of a current encoding block, where the motion vector group includes at least one motion vector of the current encoding block; determining prediction values of a first component set of a motion model initialization vector of the current encoding block according to the at least one motion vector of the motion vector group, where the motion model initialization vector includes at least four components; determining to-be-transmitted values of the first component set according to the prediction values of the first component set; and encoding the to-be-transmitted values of the first component set, and transmitting encoded to-be-transmitted values of the first component set to a decoder side.

With reference to the first aspect, in an implementation of the first aspect, the determining to-be-transmitted values of the first component set according to the prediction values of the first component set includes: determining a motion model optimization vector of the current encoding block; and determining the to-be-transmitted values of the first component set according to the prediction values of the first component set and the motion model optimization vector.

With reference to the first aspect or the foregoing implementation, in another implementation of the first aspect, the method further includes: determining a motion model quantization precision according to a size of the current encoding block and precision information; and correspondingly, the determining the to-be-transmitted values of the first component set according to the prediction values of the first component set and the motion model optimization vector includes: quantizing the motion model optimization vector according to the motion model quantization precision; and determining the to-be-transmitted values of the first component set according to the prediction values of the first component set and a quantized motion model optimization vector.

With reference to the first aspect or the foregoing implementations, in another implementation of the first aspect, the size of the current encoding block includes a width of the current encoding block and a height of the current encoding block, and the precision information includes a quantization precision of the motion vector group; and correspondingly, the determining a motion model quantization precision according to a size of the current encoding block and precision information includes: determining the motion model quantization precision Q according to the following formula:

$$Q=1/(S\times P), S=\max(W,H)$$

where P is the quantization precision of the motion vector group, W is the width of the current encoding block, and H is the height of the current encoding block.

With reference to the first aspect or the foregoing implementations, in another implementation of the first aspect, the motion model initialization vector and the motion model optimization vector each include six components, where the six components of the motion model initialization vector are in a one-to-one correspondence to the six components of the motion model optimization vector, the motion vector group includes three motion vectors, and the three motion vectors are corresponding to three pixels in the current encoding block.

With reference to the first aspect or the foregoing implementations, in another implementation of the first aspect, the first component set includes at least one component of the six components of the motion model initialization vector, and the six components $a_i$ of the motion model initialization vector are determined according to following formulas:

$$a_0 = -v_{x0}$$
$$a_1 = -v_{y0}$$
$$a_2 = \frac{W - (v_{x1} - v_{y0})}{W}$$
$$a_3 = \frac{v_{y0} - v_{y1}}{W}$$
$$a_4 = \frac{v_{x0} - v_{x2}}{H}$$
$$a_5 = \frac{H - v_{y0} + v_{y2}}{H}$$

where i=0, 1, 2, 3, 4, 5, W is the width of the current encoding block, H is the height of the current encoding block, $v_{xj}$ is an x-directional component of the motion vector $v_j$, $v_{yj}$ is a y-directional component of the motion vector $v_j$, and j=0, 1, 2.

With reference to the first aspect or the foregoing implementations, in another implementation of the first aspect, the first component set includes two components of the motion model initialization vector; and the determining the to-be-transmitted values of the first component set according to the prediction values of the first component set and a quantized motion model optimization vector includes: determining the to-be-transmitted values of the first component set, where the to-be-transmitted values of the first component set include $\Delta a_0$ and $\Delta a_1$, $\Delta a_0 = \overline{a}_0' - \overline{a}_0$, $\Delta a_1 = \overline{a}_1' - \overline{a}_1$, $\overline{a}_0'$ and $\overline{a}_1'$ are quantized motion model optimization vectors corresponding to the first component set, and $\overline{a}_0$ and $\overline{a}_1$ are numeric values obtained after prediction values $a_0$ and $a_1$ of the first component set are quantized.

With reference to the first aspect or the foregoing implementations, in another implementation of the first aspect, the first component set includes the six components of the motion model initialization vector; and the determining the to-be-transmitted values of the first component set according to the prediction values of the first component set and a quantized motion model optimization vector includes: determining the to-be-transmitted values of the first component set, where the to-be-transmitted values of the first component set include $\Delta a_i$, where i=0, 1, 2, 3, 4, 5, $\Delta a_i = \overline{a}_i' - a_i$, $\overline{a}_i'$ is the quantized motion model optimization vector, and $a_i$ is the prediction value of the first component set.

With reference to the first aspect or the foregoing implementations, in another implementation of the first aspect, the determining a motion vector group of a current encoding block includes: determining multiple candidate blocks of the current encoding block, where each candidate block of the multiple candidate blocks is an encoded block adjacent to the current encoding block; determining a matching error value between a prediction block corresponding to a motion vector of each candidate block of the multiple candidate blocks and the current encoding block; determining, as a target candidate block of the current encoding block, a candidate block corresponding to a smallest matching error value in multiple matching error values corresponding to the multiple candidate blocks; obtaining a picture order count of a reference frame of the current encoding block and a picture order count of a reference frame of the target candidate block; determining a first motion vector in the motion vector group according to a ratio of the picture order count of the reference frame of the current encoding block to the picture order count of the reference frame of the target candidate block, where a ratio of the first motion vector to a motion vector of the target candidate block is the same as the ratio of the picture order count of the reference frame of the current encoding block to the picture order count of the reference frame of the target candidate block; and determining the motion vector group according to the first motion vector.

With reference to the first aspect or the foregoing implementations, in another implementation of the first aspect, the determining a motion vector group of a current encoding block includes: determining multiple candidate blocks corresponding to a same pixel in the current encoding block, where each candidate block of the multiple candidate blocks is an encoded block adjacent to the current encoding block; determining a matching error value between a prediction block corresponding to a motion vector of each candidate block of the multiple candidate blocks and the current encoding block; determining, as a target candidate block of the current encoding block, a candidate block corresponding to a smallest matching error value in multiple matching error values corresponding to the multiple candidate blocks; determining a motion vector of the target candidate block as a first motion vector in the motion vector group; determining a second motion vector in the motion vector group according to the first motion vector; and determining the motion vector group according to the first motion vector and the second motion vector.

With reference to the first aspect or the foregoing implementations, in another implementation of the first aspect, the determining a motion vector group of a current encoding block includes: determining multiple candidate motion vector groups of the current encoding block, where each candidate motion vector group of the multiple candidate motion vector groups includes three candidate motion vectors; determining a candidate reference frame corresponding to each candidate motion vector group of the multiple candidate motion vector groups; for each candidate motion vector group, determining coordinate values of each pixel, at a corresponding prediction point in the candidate reference frame, in the current encoding block; for each candidate motion vector group, determining a matching error value of the current encoding block according to coordinate values of each pixel in the current encoding block and the coordinate values of each pixel, at the corresponding prediction point in the candidate reference frame, in the current encoding block; and determining, as the motion vector group of the current encoding block, the candidate motion vector group corresponding to a smallest matching error value of the current encoding block.

With reference to the first aspect or the foregoing implementations, in another implementation of the first aspect, the determining a motion model optimization vector of the current encoding block includes: determining a first prediction block of the current encoding block according to the motion model initialization vector; determining a first matching error value between the current encoding block and the first prediction block; determining, from multiple prediction blocks included in the reference frame of the current encoding block, a second prediction block with a smallest matching error value relative to the current encoding block; determining a second matching error value between the current encoding block and the second prediction block; and determining the motion model optimization vector of the current encoding block according to the first matching error value and the second matching error value.

With reference to the first aspect or the foregoing implementations, in another implementation of the first aspect, the determining the motion model optimization vector of the current encoding block according to the first matching error value and the second matching error value includes: when the first matching error value is less than the second matching error value, determining the motion model initialization vector as the motion model optimization vector; or when the first matching error value is greater than the second matching error value, determining the motion model optimization vector according to a pixel of the second prediction block and a pixel of the current encoding block.

According to a second aspect, a video image decoding method is provided, where the method includes: determining a motion vector group and a motion model transmission vector of a current decoding block according to a bitstream, where the motion vector group includes at least one motion vector of the current decoding block, and the motion model transmission vector includes at least four components; determining prediction values of a first component set of a motion model initialization vector of the current decoding block according to the at least one motion vector of the motion vector group, where the motion model initialization vector includes at least four components; and determining a motion model optimization vector of the current decoding block according to the prediction values of the first component set and the motion model transmission vector, so as to decode the current decoding block according to the motion model optimization vector.

With reference to the second aspect, in an implementation of the second aspect, the method further includes: determining a motion model quantization precision of the current decoding block; quantizing the motion model optimization vector according to the motion model quantization precision; and decoding the current decoding block according to a quantized motion model optimization vector.

With reference to the second aspect or the foregoing implementation, in another implementation of the second aspect, the determining a motion model quantization precision of the current decoding block includes: determining the motion model quantization precision according to a size of the current decoding block and precision information.

With reference to the second aspect or the foregoing implementations, in another implementation of the second aspect, the size of the current decoding block includes a width of the current decoding block and a height of the current decoding block, and the precision information includes a quantization precision of the motion vector group; and correspondingly, the determining the motion model quantization precision according to a size of the current decoding block and precision information includes: determining the motion model quantization precision Q according to the following formula:

$Q=1/(S \times P), S=\max(W,H)$ where P is the quantization precision of the motion vector group, W is the width of the current decoding block, and H is the height of the current decoding block.

With reference to the second aspect or the foregoing implementations, in another implementation of the second aspect, the motion model initialization vector, the motion model transmission vector, and the motion model optimization vector each include six components, the motion vector group includes three motion vectors, and the three motion vectors are in a one-to-one correspondence to three pixels in the current decoding block.

With reference to the second aspect or the foregoing implementations, in another implementation of the second aspect, the first component set includes at least one component of the six components of the motion model initialization vector, and the six components $a_i$ of the motion model initialization vector are determined according to following formulas:

$$a_0 = -v_{x0}$$

$$a_1 = -v_{y0}$$

$$a_2 = \frac{W - (v_{x1} - v_{y0})}{W}$$

$$a_3 = \frac{v_{y0} - v_{y1}}{W}$$

$$a_4 = \frac{v_{x0} - v_{x2}}{H}$$

$$a_5 = \frac{H - v_{y0} + v_{y2}}{H}$$

where i=0, 1, 2, 3, 4, 5, W is the width of the current decoding block, H is the height of the current decoding block, $v_{xj}$ is an x-directional component of the motion vector $v_j$, $v_{yj}$ is a y-directional component of the motion vector $v_j$, and j=0, 1, 2.

With reference to the second aspect or the foregoing implementations, in another implementation of the second aspect, the first component set includes two components of the motion model initialization vector; and the determining a motion model optimization vector of the current decoding block according to the prediction values of the first component set and the motion model transmission vector includes: determining that the motion model optimization vector of the current decoding block is $(a_0', a_1', a_2', a_3', a_4', a_5')$, where $(\Delta a_0, \Delta a_1)=(a_0', a_1')-(\bar{a}_0, \bar{a}_1)$, $(\Delta a_2, \Delta a_3, \Delta a_4, \Delta a_5)=(\Delta a_2', \Delta a_3', \Delta a_4', \Delta a_5')$, $\Delta a_i$ is the motion model transmission vector, and $\bar{a}_0$ and $\bar{a}_1$ are numeric values obtained after prediction values $a_0$ and $a_1$ of the first component set are quantized.

With reference to the second aspect or the foregoing implementations, in another implementation of the second aspect, the first component set includes the six components of the motion model initialization vector; and the determining an optimal parameter of the motion model of the current decoding block according to a prediction parameter of the motion model and a decoding parameter of the motion model includes: determining that the motion model optimization vector of the current decoding block is $(a_0', a_1', a_2', a_3', a_4', a_5')$, where $\Delta a_i = a_i' - a_i$, $\Delta a_i$ is the motion model transmission vector, $a_i$ is the prediction value of the first component set, and i=0, 1, 2, 3, 4, 5.

With reference to the second aspect or the foregoing implementations, in another implementation of the second aspect, the determining a motion vector group and a motion model transmission vector of a current decoding block includes: determining a target candidate block of the current decoding block and a motion vector of the target candidate block according to the bitstream; obtaining a picture order count of a reference frame of the current decoding block and a picture order count of a reference frame of the target candidate block; determining a first motion vector in the motion vector group according to a ratio of the picture order count of the reference frame of the current decoding block to the picture order count of the reference frame of the target candidate block, where a ratio of the first motion vector to the motion vector of the target candidate block is the same as the ratio of the picture order count of the reference frame of the current decoding block to the picture order count of the reference frame of the target candidate block; and determining the motion vector group according to the first motion vector.

With reference to the second aspect or the foregoing implementations, in another implementation of the second aspect, the determining a motion vector group and a motion model transmission vector of a current decoding block according to a bitstream includes: determining a motion vector of a target candidate block of the current decoding block according to the bitstream; determining the motion vector of the target candidate block of the current decoding block as a first motion vector in the motion vector group; determining a second motion vector in the motion vector group according to the first motion vector; and determining the motion vector group according to the first motion vector and the second motion vector.

According to a third aspect, an encoding device is provided, where the encoding device includes: a first determining module, configured to determine a motion vector group of a current encoding block, where the motion vector group includes at least one motion vector of the current encoding block; a second determining module, configured to determine prediction values of a first component set of a motion model initialization vector of the current encoding block according to the at least one motion vector of the motion vector group, where the motion model initialization vector includes at least four components; a third determining module, configured to determine to-be-transmitted values of the first component set according to the prediction values of the first component set; and an encoding module, configured to encode the to-be-transmitted values of the first component set, and transmit encoded to-be-transmitted values of the first component set to a decoder side.

With reference to the third aspect, in an implementation of the third aspect, the third determining module is specifically configured to: determine a motion model optimization vector of the current encoding block; and determine the to-be-transmitted values of the first component set according to the prediction values of the first component set and the motion model optimization vector.

With reference to the third aspect and the foregoing implementation, in another implementation of the third aspect, the third determining module is specifically configured to: determine a motion model quantization precision according to a size of the current encoding block and precision information; quantize the motion model optimization vector according to the motion model quantization precision; and determine the to-be-transmitted values of the first component set according to the prediction values of the first component set and a quantized motion model optimization vector.

With reference to the third aspect or the foregoing implementations, in another implementation of the third aspect, the size of the current encoding block includes a width of the current encoding block and a height of the current encoding block, and the precision information includes a quantization precision of the motion vector group; and the third determining module is specifically configured to: determine the motion model quantization precision Q according to the following formula:

$$Q=1/(S \times P), S=\max(W,H)$$

where P is the quantization precision of the motion vector group, W is the width of the current encoding block, and H is the height of the current encoding block.

With reference to the third aspect or the foregoing implementations, in another implementation of the third aspect, the motion model initialization vector and the motion model optimization vector each include six components, where the six components of the motion model initialization vector are in a one-to-one correspondence to the six components of the motion model optimization vector, the motion vector group includes three motion vectors, and the three motion vectors are corresponding to three pixels in the current encoding block.

With reference to the third aspect or the foregoing implementations, in another implementation of the third aspect, the first component set includes at least one component of the six components of the motion model initialization vector, and the second determining module is specifically configured to: determine the six components $a_i$ of the motion model initialization vector according to following formulas:

$$a_0 = -v_{x0}$$
$$a_1 = -v_{y0}$$
$$a_2 = \frac{W - (v_{x1} - v_{y0})}{W}$$
$$a_3 = \frac{v_{y0} - v_{y1}}{W}$$
$$a_4 = \frac{v_{x0} - v_{x2}}{H}$$
$$a_5 = \frac{H - v_{y0} + v_{y2}}{H}$$

where i=0, 1, 2, 3, 4, 5, W is the width of the current encoding block, H is the height of the current encoding block, $v_{xj}$ is an x-directional component of the motion vector $v_j$, $v_{yj}$ is a y-directional component of the motion vector $v_j$, and j=0, 1, 2.

With reference to the third aspect or the foregoing implementations, in another implementation of the third aspect, the first component set includes two components of the motion model initialization vector, and the second determining module is specifically configured to: determine the to-be-transmitted values of the first component set, where the to-be-transmitted values of the first component set include $\Delta a_0$ and $\Delta a_1$, $\Delta a_0 = \bar{a}_0' - \bar{a}_0$, $\Delta a_1 = \bar{a}_1' - \bar{a}_1$, $\bar{a}_0'$ and $\bar{a}_1'$ are quantized motion model optimization vectors corresponding to the first component set, and $\bar{a}_0$ and $\bar{a}_1$ are numeric values obtained after prediction values $a_0$ and $a_1$ of the first component set are quantized.

With reference to the third aspect or the foregoing implementations, in another implementation of the third aspect, the first component set includes the six components of the motion model initialization vector, and the second determining module is specifically configured to: determine the to-be-transmitted values of the first component set, where the to-be-transmitted values of the first component set include $\Delta a_i$, where i=0, 1, 2, 3, 4, 5, $\Delta a_i = \bar{a}_i' - a_i$, $\bar{a}_i'$ is the quantized motion model optimization vector, and $a_i$ is the prediction value of the first component set.

With reference to the third aspect or the foregoing implementations, in another implementation of the third aspect, the first determining module is specifically configured to: determine multiple candidate blocks of the current encoding block, where each candidate block of the multiple candidate blocks is an encoded block adjacent to the current encoding block; determine a matching error value between a prediction block corresponding to a motion vector of each candidate block of the multiple candidate blocks and the current encoding block; determine, as a target candidate block of the current encoding block, a candidate block corresponding to a smallest matching error value in multiple matching error values corresponding to the multiple candidate blocks;

obtain a picture order count of a reference frame of the current encoding block and a picture order count of a reference frame of the target candidate block; determine a first motion vector in the motion vector group according to a ratio of the picture order count of the reference frame of the current encoding block to the picture order count of the reference frame of the target candidate block, where a ratio of the first motion vector to a motion vector of the target candidate block is the same as the ratio of the picture order count of the reference frame of the current encoding block to the picture order count of the reference frame of the target candidate block; and determine the motion vector group according to the first motion vector.

With reference to the third aspect or the foregoing implementations, in another implementation of the third aspect, the first determining module is specifically configured to: determine multiple candidate blocks corresponding to a same pixel in the current encoding block, where each candidate block of the multiple candidate blocks is an encoded block adjacent to the current encoding block; determine a matching error value between a prediction block corresponding to a motion vector of each candidate block of the multiple candidate blocks and the current encoding block; determine, as a target candidate block of the current encoding block, a candidate block corresponding to a smallest matching error value in multiple matching error values corresponding to the multiple candidate blocks; determine a motion vector of the target candidate block as a first motion vector in the motion vector group; determine a second motion vector in the motion vector group according to the first motion vector; and determine the motion vector group according to the first motion vector and the second motion vector.

With reference to the third aspect or the foregoing implementations, in another implementation of the third aspect, the first determining module is specifically configured to: determine multiple candidate motion vector groups of the current encoding block, where each candidate motion vector group of the multiple candidate motion vector groups includes three candidate motion vectors; determine a candidate reference frame corresponding to each candidate motion vector group of the multiple candidate motion vector groups; for each candidate motion vector group, determine coordinate values of each pixel, at a corresponding prediction point in the candidate reference frame, in the current encoding block; for each candidate motion vector group, determine a matching error value of the current encoding block according to coordinate values of each pixel in the current encoding block and the coordinate values of each pixel, at the corresponding prediction point in the candidate reference frame, in the current encoding block; and determine, as the motion vector group of the current encoding block, the candidate motion vector group corresponding to a smallest matching error value of the current encoding block.

With reference to the third aspect or the foregoing implementations, in another implementation of the third aspect, the third determining module is specifically configured to: determine a first prediction block of the current encoding block according to the motion model initialization vector; determine a first matching error value between the current encoding block and the first prediction block; determine, from multiple prediction blocks included in the reference frame of the current encoding block, a second prediction block with a smallest matching error value relative to the current encoding block; determine a second matching error value between the current encoding block and the second prediction block; and determine the motion model optimization vector of the current encoding block according to the first matching error value and the second matching error value.

With reference to the third aspect or the foregoing implementations, in another implementation of the third aspect, the third determining module is specifically configured to: when the first matching error value is less than the second matching error value, determine the motion model initialization vector as the motion model optimization vector; or when the first matching error value is greater than the second matching error value, determine the motion model optimization vector according to a pixel of the second prediction block and a pixel of the current encoding block.

According to a fourth aspect, a decoding device for video image decoding is provided, where the decoding device includes: a first determining module, configured to determine a motion vector group and a motion model transmission vector of a current decoding block according to a bitstream, where the motion vector group includes at least one motion vector of the current decoding block, and the motion model transmission vector includes at least four components; a second determining module, configured to determine prediction values of a first component set of a motion model initialization vector of the current decoding block according to the at least one motion vector of the motion vector group, where the motion model initialization vector includes at least four components; and a third determining module, configured to determine a motion model optimization vector of the current decoding block according to the prediction values of the first component set and the motion model transmission vector, so as to decode the current decoding block according to the motion model optimization vector.

With reference to the fourth aspect, in an implementation of the fourth aspect, the third determining module is specifically configured to: determine a motion model quantization precision of the current decoding block; quantize the motion model optimization vector according to the motion model quantization precision; and decode the current decoding block according to a quantized motion model optimization vector.

With reference to the fourth aspect or the foregoing implementation, in another implementation of the fourth aspect, the third determining module is specifically configured to: determine the motion model quantization precision according to a size of the current decoding block and precision information.

With reference to the fourth aspect or the foregoing implementations, in another implementation of the fourth aspect, the size of the current decoding block includes a width of the current decoding block and a height of the current decoding block, and the precision information includes a quantization precision of the motion vector group; and the third determining module is specifically configured to: determine the motion model quantization precision Q according to the following formula:

$$Q=1/(S\times P), S=\max(W,H)$$

where P is the quantization precision of the motion vector group, W is the width of the current decoding block, and H is the height of the current decoding block.

With reference to the fourth aspect or the foregoing implementations, in another implementation of the fourth aspect, the motion model initialization vector, the motion model transmission vector, and the motion model optimization vector each include six components, the motion vector group includes three motion vectors, and the three motion vectors are in a one-to-one correspondence to three pixels in the current decoding block.

With reference to the fourth aspect or the foregoing implementations, in another implementation of the fourth aspect, the first component set includes at least one component of the six components of the motion model initialization vector, and the second determining module is specifically configured to: determine the six components $a_i$ of the motion model initialization vector according to following formulas:

$$a_0 = -v_{x0}$$
$$a_1 = -v_{y0}$$
$$a_2 = \frac{W - (v_{x1} - v_{y0})}{W}$$
$$a_3 = \frac{v_{y0} - v_{y1}}{W}$$
$$a_4 = \frac{v_{x0} - v_{x2}}{H}$$
$$a_5 = \frac{H - v_{y0} + v_{y2}}{H}$$

where i=0, 1, 2, 3, 4, 5, W is the width of the current decoding block, H is the height of the current decoding block, $v_{xj}$ is an x-directional component of the motion vector $v_j$, $v_{yj}$ is a y-directional component of the motion vector $v_j$, and j=0, 1, 2.

With reference to the fourth aspect or the foregoing implementations, in another implementation of the fourth aspect, the first component set includes two components of the motion model initialization vector; and the second determining module is specifically configured to: determine that the motion model optimization vector of the current decoding block is ($a_0'$, $a_1'$, $a_2'$, $a_3'$, $a_4'$, $a_5'$), where ($\Delta a_0$, $\Delta a_1$)=($a_0'$, $a_1'$)−($\overline{a}_0$, $\overline{a}_1$), ($\Delta a_2$, $\Delta a_3$, $\Delta a_4$, $\Delta a_5$)=($\Delta a_2'$, $\Delta a_3'$, $\Delta a_4'$, $\Delta a_5'$), $\Delta a_i$ is the motion model transmission vector, and $\overline{a}_0$ and $\overline{a}_1$ are numeric values obtained after prediction values $a_0$ and $a_1$ of the first component set are quantized.

With reference to the fourth aspect or the foregoing implementations, in another implementation of the fourth aspect, the first component set includes the six components of the motion model initialization vector; and the second determining module is specifically configured to: determine that the motion model optimization vector of the current decoding block is ($a_0'$, $a_1'$, $a_2'$, $a_3'$, $a_4'$, $a_5'$), where $\Delta a_i = a_i' - a_i$, $\Delta a_i$ is the motion model transmission vector, $a_i$ is the prediction value of the first component set, and i=0, 1, 2, 3, 4, 5.

With reference to the fourth aspect or the foregoing implementations, in another implementation of the fourth aspect, the first determining module is specifically configured to: determine a target candidate block of the current decoding block and a motion vector of the target candidate block according to the bitstream; obtain a picture order count of a reference frame of the current decoding block and a picture order count of a reference frame of the target candidate block; determine a first motion vector in the motion vector group according to a ratio of the picture order count of the reference frame of the current decoding block to the picture order count of the reference frame of the target candidate block, where a ratio of the first motion vector to the motion vector of the target candidate block is the same as the ratio of the picture order count of the reference frame of the current decoding block to the picture order count of the reference frame of the target candidate block; and determine the motion vector group according to the first motion vector.

With reference to the fourth aspect or the foregoing implementations, in another implementation of the fourth aspect, the first determining module is specifically configured to: determine a motion vector of a target candidate block of the current decoding block according to the bitstream; determine the motion vector of the target candidate block of the current decoding block as a first motion vector in the motion vector group; determine a second motion vector in the motion vector group according to the first motion vector; and determine the motion vector group according to the first motion vector and the second motion vector.

Based on the foregoing technical solutions, according to the video image encoding method, the video image decoding method, the encoding device, and the decoding device in this embodiment of the present application, a motion vector group of a current encoding block is determined; a motion model initialization vector of the current encoding block is determined according to the motion vector group; to-be-transmitted values of a motion model are determined according to the motion model initialization vector; and the to-be-transmitted values of the motion model are encoded for transmission, so that a decoder side performs decoding according to the to-be-transmitted values of the motion model. In this way, a volume of data and a quantity of occupied bits in encoding and decoding transmission can be reduced.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

FIG. 2 is a schematic diagram of a current encoding block or a current decoding block and a candidate block according to an embodiment of the present application;

FIG. 3 is a schematic flowchart of a video image decoding method according to another embodiment of the present application;

DESCRIPTION OF EMBODIMENTS

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

Figure 1:
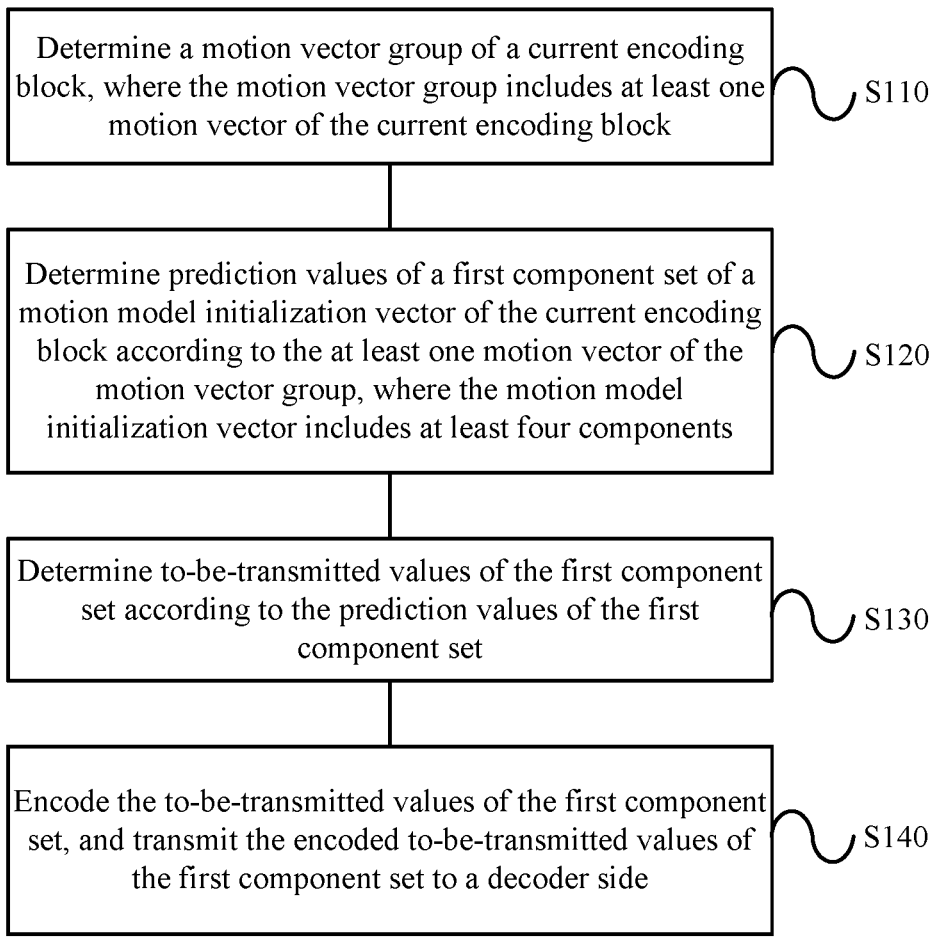
FIG. 1 is a schematic flowchart of a video image encoding method according to an embodiment of the present application.

FIG. 1 is a schematic flowchart of a video image encoding method according to an embodiment of the present application. The method shown in FIG. 1 may be executed by an encoding device, such as an encoder. Specifically, as shown in FIG. 1, the method 100 includes the following steps:

S110. Determine a motion vector group of a current encoding block, where the motion vector group includes at least one motion vector of the current encoding block.

S120. Determine prediction values of a first component set of a motion model initialization vector of the current encoding block according to the at least one motion vector of the motion vector group, where the motion model initialization vector includes at least four components.

S130. Determine to-be-transmitted values of the first component set according to the prediction values of the first component set.

S140. Encode the to-be-transmitted values of the first component set, and transmit encoded to-be-transmitted values of the first component set to a decoder side.

Specifically, the motion vector group of the current encoding block is determined, where the motion vector group includes at least one motion vector corresponding to a pixel in the current encoding block. The prediction values of the first component set of the motion model initialization vector of the current encoding block are determined according to the at least one motion vector of the motion vector group, where the motion model initialization vector includes at least four components, and the first component set includes at least one component of the motion model initialization vector. Then, a motion model quantization precision and a motion model optimization vector are determined according to the current encoding block, and the motion model optimization vector is quantized according to the quantization precision. The to-be-transmitted values of the first component set may be determined according to the prediction values of the first component set of the motion model initialization vector and a quantized motion model optimization vector, and the to-be-transmitted values of the first component set are encoded and is transmitted to the decoder side, so that the decoder side performs a decoding operation. Further, a prediction sample of the current encoding block may be determined according to the quantized motion model optimization vector, and according to the prediction sample, the current encoding block is encoded and transmitted.

Therefore, according to the video image encoding method in this embodiment of the present application, a motion vector group of a current encoding block is determined; a motion model initialization vector of the current encoding block is determined according to the motion vector group; to-be-transmitted values of a motion model are determined according to the motion model initialization vector; and the to-be-transmitted values of the motion model are encoded for transmission, so that a decoder side performs decoding according to the to-be-transmitted values of the motion model. In this way, a volume of data and a quantity of occupied bits in encoding and decoding transmission can be reduced.

In this embodiment of the present application, for a video image encoding process in all encoding standards, with regard to inter prediction, multiple motion models may be used in a motion compensation computation process, such as an affine motion model, a general motion model, or a perspective model. Herein, the affine motion model is used as an example for description, but the present application is not limited thereto.

In S110, the motion vector group of the current encoding block is determined. The motion vector group includes at least one motion vector of the current encoding block, and each motion vector may be corresponding to a pixel in the current encoding block. A quantity of parameters required for describing a motion model varies between motion models. For a motion model having 2n parameters, the motion vector group of the current encoding block may generally include n motion vectors. For example, for an affine motion, when all pixels in the current encoding block are represented by using the affine motion model, generally, the affine motion model may be expressed as $\vec{A}=(a_0, a_1, a_2, a_3, a_4, a_5)^T$. That is, the affine motion model has six parameters, and the motion vector group includes at least three motion vectors. For a general motion model, 12 parameters are generally used, and the motion vector group includes at least six motion vectors. Optionally, determining at least one motion vector of the motion vector group may be determining one motion vector of the motion vector group, or determining n motion vectors or all motion vectors of the motion vector group. For example, for the affine motion, the motion vector group may include at least three motion vectors, and the determining a motion vector group of a current encoding block may be determining one motion vector, three motion vectors, or all motion vectors of the motion vector group. The present application is not limited thereto.

Optionally, in an embodiment, an affine motion is used as an example. The motion vector group includes three motion vectors, and the determining a motion vector group of a current encoding block may be determining at least one motion vector of the motion vector group. For a High Efficiency Video Coding (HEVC) standard, a first motion vector in the motion vector group of the current encoding block may be determined by using an Advanced Motion Vector Prediction (AMVP) technology. Specifically, first, multiple candidate blocks of the current encoding block are determined from encoded blocks neighboring around the current encoding block. The multiple candidate blocks may be determined according to coordinate locations, and the multiple candidate blocks are adjacent to the current encoding block. For example, as shown in FIG. 2, for the current encoding block, generally, A to G may be determined as the multiple candidate blocks of the current encoding block. Then, a matching error value between a prediction block corresponding to a motion vector of each candidate block and the current encoding block is determined. Specifically, the prediction block corresponding to the motion vector of the candidate block is determined in a reference frame according to the motion vector of the candidate block and the current encoding block; and then, the matching error value between the prediction block and the current encoding block is calculated, and a candidate block corresponding to a smallest matching error value is determined as a target candidate block of the current encoding block. Next, a picture order count (POC) of a reference frame of the current encoding block and a picture order count (POC) of a reference frame of the target candidate block are separately determined. Scaling is performed on a motion vector of the target candidate block according to a ratio of the picture order count (POC) of the reference frame of the current encoding block to the picture order count (POC) of the reference frame of the target candidate block. A scaled motion vector of the target candidate block is determined as the first motion vector in the motion vector group of the current encoding block. A ratio of the first motion vector to the motion vector of the target candidate block is the same as the ratio of the picture order count of the reference frame of the current encoding block to the picture order count of the reference frame of the target candidate block.

In this embodiment of the present application, the determined motion vector of the target candidate block may be determined as a searching start point in subsequent motion estimation. The encoding device may encode an index value corresponding to the target candidate block, and transmit the encoded index value to the decoder side, so that the decoder side performs decoding and determines the target candidate block and the motion vector of the target candidate block.

In this embodiment of the present application, the matching error value between the prediction block corresponding to the motion vector of each candidate block and the current encoding block may be determined according to the following method. Specifically, for each pixel in the current encoding block, a matching error value of each pixel may be determined according to the following formulas (1) to (4):

$$e(x_i, y_j) = s(x_i, y_j) - s'(x_i, y_j) - (Gx_i, Gy_j, x_i Gx_i, x_i Gy_j, y_j Gx_i, y_j Gy_j) \cdot \vec{A} \quad (1)$$

$$\Phi(x_i, y_j) = s(x_i, y_j) - s'(x_i, y_j) \quad (2)$$

$$F(x_i, y_j) = (Gx_i, Gy_j, x_i Gx_i, x_i Gy_j, y_j Gx_i, y_j Gy_j) \quad (3)$$

$$\vec{A} = (a_0, a_1, a_2, a_3, a_4, a_5)^T = (F^T \cdot F)^{-1} \cdot F^T \cdot \Phi \quad (4)$$

where $s(x_i, y_j)$ is an original pixel value of the pixel, $s'(x_i, y_j)$ is a prediction pixel value of the pixel in a frame to which a motion vector of the candidate block points, $x_i$ and $y_i$ are coordinate values of the pixel, $Gx_i$ is a horizontal gradient of a location of the pixel, and $Gy_i$ is a vertical gradient of the location of the pixel. These gradients may be obtained through calculation by using a Sobel (Sobel) operator.

In this embodiment of the present application, according to the foregoing formulas, a matching error value of each pixel in the current encoding block relative to the prediction block corresponding to the motion vector of the candidate block may be determined. Absolute values of the matching error values of all the pixels in the current encoding block are added up, and the matching error value between the current encoding block and the prediction block corresponding to the candidate block may be obtained. However, the present application is not limited thereto. According to the foregoing method, the matching error value between the current encoding block and the prediction block corresponding to each candidate block is sequentially determined. A candidate block corresponding to a smallest matching error value is used as the target candidate block of the current encoding block.

Optionally, in an embodiment, an affine motion is used as an example. The motion vector group of the current encoding block is determined. The motion vector group includes three motion vectors. After one motion vector, namely, the first motion vector, of the motion vector group is determined according to the foregoing method, as shown in FIG. 2, the first motion vector may be a motion vector corresponding to a vertex of the current encoding block. Optionally, motion vectors of two vertexes adjacent to the vertex of the current encoding block may be selected as the other motion vectors in the motion vector group. The motion vector group may be expressed as $\{v_0, v_1, v_2\}$, and coordinates of the motion vectors in the motion vector group are (0,0), (W,0), and (0,H), where W is a width of the current encoding block, and H is a height of the current encoding block.

Optionally, in an embodiment, an affine motion is used as an example. The motion vector group includes three motion vectors, and the determining a motion vector group of a current encoding block may be determining each motion vector of the motion vector group. Specifically, first, multiple encoded blocks neighboring around the current encoding block may be determined as multiple candidate blocks. The multiple candidate blocks are corresponding to a same pixel in the current encoding block. Optionally, the pixel may be a vertex of the current encoding block. For example, as shown in FIGS. 2, A, B, and C may be determined as the multiple candidate blocks of the current encoding block. According to formulas (1) to (4), a matching error value of each pixel in the current encoding block relative to a prediction block corresponding to the motion vector of each candidate block is separately determined. Then, absolute values of the matching error values of all pixels are added up. A matching error value of each candidate block relative to the current encoding block is determined. A candidate block corresponding to a smallest matching error value is selected as a target candidate block of the current encoding block. A motion vector of the target candidate block is determined as the first motion vector in the motion vector group of the current encoding block. A reference frame of the target candidate block is determined as a reference frame of the current encoding block. The motion vector of the target candidate block is used as the first motion vector of the current encoding block. Further, the first motion vector may be used as a searching start point in subsequent motion estimation. The encoding device may encode an index value corresponding to the target candidate block, and transmit the encoded index value to the decoder side, so that the decoder side performs decoding and determines the target candidate block and the motion vector of the target candidate block.

In this embodiment of the present application, after the first motion vector in the motion vector group of the current encoding block is determined, a second motion vector in the motion vector group of the current encoding block is determined according to the first motion vector. The second motion vector is a motion vector in the motion vector group different from the first motion vector. Specifically, first, multiple candidate blocks of the current encoding block are determined from encoded blocks neighboring around the current encoding block. The multiple candidate blocks are corresponding to a same pixel in the current encoding block. Optionally, the pixel may be a vertex of the current encoding block. The pixel is different from the pixels corresponding to the multiple candidate blocks in determining the first motion vector. For example, as shown in FIG. 2, the candidate blocks may include D and E, and the multiple candidate blocks do not include the candidate block in determining the first motion vector. Then, a reference frame of each candidate block is determined. If the reference frame of the candidate block is not a same frame as the reference frame of the target candidate block corresponding to the first motion vector, that is, the reference frame of the current encoding block, scaling is performed on the motion vector of the candidate block according to a ratio of a picture order count POC of the reference frame of the target candidate block of the current encoding block to a picture order count POC of the reference frame of the candidate block, so that the ratio of the picture order count of the reference frame of the current block to the picture order count of the reference frame of the candidate block is the same as a ratio between motion vectors. A scaled motion vector of each candidate block is separately compared with the first motion vector. When the scaled motion vector of the candidate block is different from the first motion vector, and a difference is the smallest, this candidate block is determined as a second target candidate block of the current encoding block, and the scaled motion vector corresponding to this target candidate block is determined as the second motion vector in the motion vector group of the current encoding block.

In this embodiment of the present application, multiple second motion vectors may be determined according to the foregoing method. For example, when the motion vector group of the current encoding block includes three motion vectors, after one first motion vector of the motion vector group is determined, the other two second motion vectors may be determined according to the foregoing method. However, the present application is not limited thereto.

Optionally, in an embodiment, an affine motion is used as an example. The motion vector group of the current encoding block is determined. The motion vector group includes three motion vectors, and each motion vector of the motion vector group may be further determined according to the following method. Specifically, multiple candidate blocks of the current encoding block are determined. All the multiple candidate blocks are encoded blocks adjacent to the current encoding block. For example, as shown in FIG. 2, A to F are the multiple candidate blocks of the current encoding block. Then, multiple candidate motion vector groups of the current encoding block are determined according to the multiple candidate blocks. Each candidate motion vector group includes three motion vectors, and the three motion vectors are corresponding to three pixels in the current encoding block. Optionally, motion vectors of several candidate blocks that are selected from the multiple candidate blocks may be used as the candidate motion vector group. For example, as shown in FIG. 2, for the multiple candidate blocks A to F, three motion vectors, including a motion vector of a block randomly selected from the candidate blocks A, B, and C that are corresponding to a same pixel, a motion vector of a block randomly selected from D and E that are corresponding to another pixel, and a motion vector of a block randomly selected from F and G that are corresponding to another pixel, may constitute a candidate motion vector group. As there are different selections, these candidate blocks can constitute 12 candidate motion vector groups. A reference frame of each motion vector of a first candidate motion vector group is determined. The first candidate motion vector group is any candidate motion vector group of the multiple candidate motion vector groups. Proportional scaling is performed on an index number and a picture order count of a reference frame of a candidate block corresponding to each motion vector of the first candidate motion vector group, so that the three motion vectors of the first candidate motion vector group are corresponding to a same reference frame index number and picture order count.

In this embodiment of the present application, a prediction location, in the reference frame of the first candidate motion vector group, of each pixel in the current encoding block may be determined according to the following formulas (5) and (6):

$$\begin{cases} x' = a_0 + a_2 x + a_4 y \\ y' = a_1 + a_3 x + a_5 y \end{cases} \quad (5)$$

$$\begin{cases} a_0 = -v_{x0} \\ a_1 = -v_{y0} \\ a_2 = \dfrac{W - (v_{x1} - v_{y0})}{W} \\ a_3 = \dfrac{v_{y0} - v_{y1}}{W} \\ a_4 = \dfrac{v_{x0} - v_{x2}}{H} \\ a_5 = \dfrac{H - v_{y0} + v_{y2}}{H} \end{cases} \quad (6)$$

where W is a width of the current encoding block, H is a height of the current encoding block, $v_{xj}$ is an x-directional component of the $j^{th}$ candidate motion vector $v_j$ in the first candidate motion vector group, $v_{yj}$ is a y-directional component of the $j^{th}$ candidate motion vector $v_j$ in the first candidate motion vector group, j=0, 1, 2, x and y are coordinate values of each pixel in the current encoding block, and x' and y' are coordinate values, at a prediction point corresponding to the reference frame in the first candidate motion vector group, of the pixel.

According to the coordinate values of each pixel in the current encoding block and the coordinate values of the pixel, at the prediction point corresponding to the reference frame, in the current encoding block, for the first candidate motion vector group, a matching error value between each pixel in the current encoding block and the prediction point corresponding to the reference frame of the first candidate motion vector group is determined according to formula (1), where $\vec{A} = (a_0, a_1, a_2, a_3, a_4, a_5)^T$. An absolute value of the matching error value between each pixel and the prediction point corresponding to the reference frame of the first candidate motion vector group is calculated, and the absolute values are added up, to determine a matching error value of the current encoding block relative to the first candidate motion vector group. Similarly, a matching error value of the current encoding block relative to each candidate motion vector group is determined, and the candidate motion vector group corresponding to a smallest value in multiple matching error values corresponding to multiple candidate motion vector groups is determined as the motion vector group of the current encoding block. An index value of a motion vector included in the motion vector group is encoded and transmitted to the decoder side, so that the decoder side determines the motion vector group according to the index value.

In this embodiment of the present application, for the determined motion vector group, any motion vector of the motion vector group may be used as a searching start point in subsequent motion estimation. Optionally, as shown in FIG. 2, a prediction location of a vertex in the upper-left corner of the current encoding block may be used as the searching start point in subsequent motion estimation. The present application is not limited thereto.

In S120, the prediction values of the first component set of the motion model initialization vector of the current encoding block are determined according to the at least one motion vector of the motion vector group. The motion model initialization vector includes the at least four components. The first component set includes at least one component of the motion model initialization vector. Specifically, an affine motion model is used as an example. The affine model may be represented by using six parameters, and the six parameters may be expressed as $\vec{A}=(a_0, a_1, a_2, a_3, a_4, a_5)^T$. A location, in a reference frame, of each pixel in the current encoding block may be determined according to the following formula (7):

$$\begin{cases} x' = a_0 + a_2 x + a_4 y \\ y' = a_1 + a_3 x + a_5 y \\ v_x = x - x' \\ v_y = y - y' \end{cases} \quad (7)$$

where x and y are coordinate values of any pixel in the current encoding block, x' and y' are coordinate values, at a corresponding prediction point in the reference frame, of the pixel, and $v_x$ and $v_y$ are motion vectors of any pixel in the current encoding block. The following formula (8) may be obtained:

$$\begin{cases} v_x = -a_0 - (a_1 - 1)x - a_4 y \\ v_y = -a_1 - a_3 x - (a_5 - 1)y \end{cases} \quad (8)$$

According to the motion vector group determined in S110, the motion vector group may be expressed as $\{v_0, v_1, v_2\}$. Target candidate blocks corresponding to the motion vector group are blocks A to G shown in FIG. 2. Therefore, coordinates of the motion vectors in the motion vector group may be expressed as (0,0), (W,0), and (0,H), where W is a width of the current encoding block, and H is a height of the current encoding block. The following formula (9) may be obtained by substituting the motion vector group and the coordinates into formula (8):

$$\begin{cases} v_x = vx_0 + \dfrac{vx_1 - vx_0}{W}x + \dfrac{vx_2 - vx_0}{H}y \\ v_y = vy_0 + \dfrac{vy_1 - vy_0}{W}x + \dfrac{vy_2 - vy_0}{H}y \end{cases} \quad (9)$$

where $v_{xj}$ is an x-directional component of the $j^{th}$ candidate motion vector $v_j$ in a first candidate motion vector group, $v_{yj}$ is a y-directional component of the $j^{th}$ candidate motion vector $v_j$ in the first candidate motion vector group, and j=0, 1, 2. Correspondingly, all the parameters in the affine motion model $\vec{A}=(a_0, a_1, a_2, a_3, a_4, a_5)^T$ may be obtained. As shown in formula (6), the motion vector group $\{v_0, v_1, v_2\}$ of the current encoding block is substituted into formula (6), and the motion model initialization vector $\vec{A}=(a_0, a_1, a_2, a_3, a_4, a_5)^T$ of the current encoding block may be determined. The motion model initialization vector is a six-dimensional vector. Optionally, for another motion model, the initialization vector is a vector including at least four dimensions. The prediction values of the first component set may be determined according to the motion model initialization vector. The prediction values of the first component set may include at least one component of the motion model initialization vector.

In S130, the to-be-transmitted values of the first component set are determined according to the prediction values of the first component set. Specifically, a motion model quantization precision and the motion model optimization vector may be determined according to the current encoding block. The motion model optimization vector is quantized according to the motion model quantization precision. The to-be-transmitted values of the first component set are determined according to the prediction values of the first component set of the motion model and a quantized motion model optimization vector.

In this embodiment of the present application, the motion model optimization vector may be first determined. Optionally, the motion model optimization vector may be determined according to the conventional art. Specifically, a matching error value of the current encoding block may be determined according to formulas (1) to (4). A candidate block of the current encoding block is searched for in a gradient iterative manner within a specific range of a reference frame of the current encoding block. A candidate block corresponding to a smallest matching error value is determined as the target candidate block of the current encoding block, and a corresponding motion model parameter $\vec{A}=(a_0', a_1', a_2', a_3', a_4', a_5')^T$ in this case is determined as the optimization vector of the current encoding block according to formula (4).

Optionally, the motion model initialization vector of the current encoding block may be further determined according to formula (6), and the motion model initialization vector is determined as the motion model optimization vector.

Optionally, the motion model initialization vector of the current encoding block may be further determined according to formula (6). A corresponding location, in a reference frame, of each pixel in the current encoding block is obtained through calculation according to formula (7). The matching error value of the current encoding block is calculated according to formula (1) and (6). This matching error value is compared with the matching error value that is corresponding to the motion model parameter and that is determined according to formulas (1) to (4) and the conventional art. A motion model parameter $\vec{A}=(a_0', a_1', a_2', a_3', a_4', a_5')^T$ corresponding to a smallest matching error value is selected as the optimization vector of the current encoding block. The present application is not limited thereto.

In this embodiment of the present application, the motion model quantization precision needs to be further determined, so that the motion model optimization vector is quantized. Specifically, the motion model optimization vector includes two translation motion parameters $a_0'$ and $a_1'$. A quantization precision of the two translation motion parameters may be $\frac{1}{16}$ or $\frac{1}{4}$. The present application is not limited thereto. A quantization precision of the other parameters ($a_2'$, $a_3'$, $a_4'$, $a_5'$) in the motion model optimization vector may be $\frac{1}{512}$. Alternatively, the quantization precision may be determined according to a size of the current encoding block and precision information. The size of the current encoding block includes a width of the current encoding block and a height of the current encoding block, and the precision information may include a quantization precision of the motion vector group of the current encoding block. Specifically, it can be learnt, according to formula (6), that the latter four parameters in the motion model are related to the width and the height of the current encoding block. Therefore, the quantization precision may be determined according to the following formula (10):

$$Q=1/(S \times P), S=\max(W,H) \quad (10)$$

P may be determined according to the precision information of the current encoding block. Specifically, 1/P is the quantization precision of the motion vector group of the current encoding block. Optionally, the quantization precision of the motion vector group is generally ¼, so P=4. W is the width of the current encoding block. H is the height of the current encoding block. For example, if the width of the current encoding block is 16 and the height is 32, the quantization precision of the motion vector group is 1/(32× 4)=1/128; if the width of the encoding block is 16 and the height is 8, the quantization precision is 1/(16×4)=1/64.

In this embodiment of the present application, the motion model optimization vector $\vec{A}=(a_0', a_1', a_2', a_3', a_4', a_5')^T$ is quantized according to the determined quantization precision, to obtain a quantized motion model optimization vector $\vec{A}=(a_0', a_1', a_2', a_3', a_4', a_5')^T$.

In this embodiment of the present application, the to-be-transmitted values of the first component set are determined according to the prediction values of the first component set and the quantized motion model optimization vector. Specifically, the determining may be performed by using the following method. Herein, an affine motion is used as an example. The motion model initialization vector is determined according to formula (6). In the motion model initialization vector, $a_0$ and $a_1$ are translation motion parameters, and are related to the first motion vector $v_0$ in the motion vector group. Optionally, $a_0$ and $a_1$ may be determined as the first component set, and values $a_0$ and $a_1$ that are determined according to formula (6) are the prediction values of the first component set. Optionally, a quantization precision of the two parameters may be 1/16 or ¼. 1/16 is used as an example. First, $v_0$ is scaled up by four times, so that the precision of $v_0$ is increased from ¼ to 1/16. Then, quantized $a_0$ and $a_1$ whose precision is also 1/16 are calculated by using $v_0$ whose precision is 1/16, to obtain $\bar{a}_0$ and $\bar{a}_1$, that is, $\bar{a}_0$ and $\bar{a}_1$ are quantized prediction values of the first component set.

In this embodiment of the present application, the to-be-transmitted values of the first component set of the current encoding block are determined according to the quantized prediction values $\bar{a}_0$ and $\bar{a}_1$ of the first component set and the determined motion model optimization vector. The motion model transmission values of the current encoding block may be ($\Delta a_0, \Delta a_1, \Delta a_2, \Delta a_3, \Delta a_4, \Delta a_5$). The first component set may include two components. The transmission values of the first component set may be $\Delta a_0$ and $\Delta a_1$, $\Delta a_0 = \bar{a}_0' - \bar{a}_0$, and $\Delta a_1 = \bar{a}_1' - \bar{a}_1$. The other transmission values are ($\Delta a_2, \Delta a_3, \Delta a_4, \Delta a_5$)=($\bar{a}_2', \bar{a}_3', \bar{a}_4', \bar{a}_5'$), $\bar{a}_i'$ is the quantized motion model optimization vector, and $\bar{a}_0$ and $\bar{a}_1$ are the quantized values of the prediction values $a_0$ and $a_1$ of the first component set. In this case, two parameters in encoding transmission parameters are differences between a quantized first component set and the motion model optimization vector. The differences are less than a quantity of bits occupied by a quantized motion model optimization vector in direct encoding transmission. This reduces a volume of transmitted data.

Optionally, in an embodiment, the to-be-transmitted values of the first component set are determined according to the prediction values of the first component set and the quantized motion model optimization vector. Specifically, the determining may be further performed by using the following method. According to formula (6), six components $a_i$ of the motion model initialization vector are determined, where i=0, 1, 2, 3, 4, 5. Then, it is determined that the first component set also includes six parameters, and the motion model transmission values of the current encoding block may be determined, that is, the transmission values of the first component set are ($\Delta a_0, \Delta a_1, \Delta a_2, \Delta a_3, \Delta a_4, \Delta a_5$), where $\Delta a_i = \bar{a}_i' - a_i$, $\bar{a}_i'$ is the quantized motion model optimization vector, and $a_i$ is the prediction value of the first component set.

In S140, the determined to-be-transmitted values of the first component set are encoded, and the encoded to-be-transmitted values of the first component set are transmitted to the decoder side. Specifically, the determined motion model to-be-transmitted vector of the current encoding block may be encoded and transmitted to the decoder side. In addition, the motion model optimization vector may be further quantized according to the motion model quantization precision, so that a prediction pixel sample of each pixel sample of the current encoding block is determined, a prediction residual of the current encoding block is further determined, and the prediction residual is encoded and transmitted to the decoder side. Specifically, for the motion model optimization vector $\vec{A}=(a_0', a_1', a_2', a_3', a_4', a_5')^T$, each parameter $a_i'$ is quantized according to the motion model quantization precision determined according to formula (10), to obtain a quantized motion model optimization vector $\vec{A}$. The quantized motion model optimization vector is substituted into formula (7), and a reference offset location (x',y') of each pixel with a precision Q in the current encoding block may be obtained. The prediction pixel sample of each pixel sample in the current encoding block is obtained through calculation in the reference offset location. Further, the prediction residual of the current encoding block is determined, and the prediction residual is encoded and transmitted to the decoder side. Optionally, the pixel sample may be one pixel or a small pixel block including multiple pixels. The present application is not limited thereto.

It should be understood that sequence numbers of the foregoing processes do not mean an execution sequence in various embodiments of the present application. The execution sequence of the processes should be determined according to functions and internal logic of the processes, and should not be construed as any limitation on the implementation processes of the embodiments of the present application.

Therefore, according to the video image encoding method in this embodiment of the present application, a motion vector group of a current encoding block is determined; a motion model initialization vector of the current encoding block is determined according to the motion vector group; to-be-transmitted values of a motion model are determined according to the motion model initialization vector; and the to-be-transmitted values of the motion model are encoded for transmission, so that a decoder side performs decoding according to the to-be-transmitted values of the motion model. In this way, a volume of data and a quantity of occupied bits in encoding and decoding transmission can be reduced. In addition, when a motion model optimization vector is determined and the optimization vector is quantized, a determined quantization precision is determined according to a size of the current encoding block and a quantization precision of a motion vector of the current encoding block. This can also reduce a quantity of bits required by an encoding parameter.

FIG. 3 is a schematic flowchart of a video image decoding method 200 according to an embodiment of the present application. The method shown in FIG. 3 may be used in an image or video decoding process, and is executed by a decoding device. As shown in FIG. 3, the method includes the following steps:

S210. Determine a motion vector group and a motion model transmission vector of a current decoding block according to a bitstream, where the motion vector group includes at least one motion vector of the current decoding block, and the motion model transmission vector includes at least four components.

S220. Determine prediction values of a first component set of a motion model initialization vector of the current decoding block according to the at least one motion vector of the motion vector group, where the motion model initialization vector includes at least four components.

S230. Determine a motion model optimization vector of the current decoding block according to the prediction values of the first component set and the motion model transmission vector, so as to decode the current decoding block according to the motion model optimization vector.

Specifically, the decoder side receives the bitstream transmitted by an encoder side, performs decoding according to the bitstream, and determines the motion vector group and the motion model transmission vector of the current decoding block, where the motion vector group includes at least one motion vector corresponding to a pixel in the current decoding block. The decoder side determines the prediction values of the first component set of the motion model initialization vector of the current decoding block according to the at least one motion vector of the motion vector group, where the motion model initialization vector includes the at least four components, and the first component set includes at least one component of the motion model initialization vector. The decoder side determines the motion model optimization vector of the current decoding block according to the prediction values of the first component set and the motion model transmission vector. Then, the decoder side determines a prediction sample of the current decoding block according to a quantized motion model optimization vector, and performs decoding and reconstruction on the current decoding block according to the prediction sample.

Therefore, according to the video image decoding method in this embodiment of the present application, a motion vector group and a motion model transmission vector of a current decoding block are determined according to a received bitstream; a motion model initialization vector of the current decoding block is determined according to the motion vector group; a motion model optimization vector is determined according to the motion model initialization vector and the motion model transmission vector; and decoding and reconstruction are performed on the motion model optimization vector. In this way, a volume of data and a quantity of occupied bits in encoding and decoding transmission can be reduced.

In S210, the decoding device determines the motion vector group and the motion model transmission vector of the current decoding block according to the bitstream. The motion vector group includes at least one motion vector of the current decoding block, and each motion vector is corresponding to one pixel in the current decoding block. Optionally, a quantity of parameters required for describing a motion model varies between motion models. For a motion model having 2n parameters, the motion model transmission vector determined by the decoder side is a 2n-dimensional vector, and the motion vector group of the current decoding block may generally include n motion vectors. For example, for an affine motion, when all pixels in the current decoding block are represented by using the affine motion model, generally, the affine motion model may be expressed as $\vec{A}=(a_0, a_1, a_2, a_3, a_4, a_5)^T$. That is, the affine motion model has six parameters, and the motion vector group may include three motion vectors. For a general motion model, 12 parameters are generally used, and the motion vector group may include six motion vectors. Optionally, the determining a motion vector group may be determining at least one motion vector of the motion vector group, or determining one motion vector of the motion vector group, or determining n motion vectors or all motion vectors of the motion vector group. For example, for the affine motion, the motion vector group may include at least three motion vectors, and the determining a motion vector group of a current decoding block may be determining one motion vector, three motion vectors, or all motion vectors of the motion vector group. According to a quantity of motion vectors determined by an encoder side, the decoder side also accordingly determines a corresponding quantity of motion vectors. The present application is not limited thereto.

In this embodiment of the present application, the decoder side may determine the motion model transmission vector and the motion vector group of the current decoding block according to the received bitstream. Specifically, the decoder side may first determine the motion model transmission vector of the current decoding block according to the received bitstream. All components of the motion model transmission vector may be differences between the motion model initialization vector and the motion model optimization vector. Alternatively, some components of the motion model transmission vector are differences between the motion model initialization vector and the motion model optimization vector, and some components are components in corresponding locations of the motion model optimization vector. The present application is not limited thereto.

Optionally, in an embodiment, an affine motion is used as an example. When the motion vector group of the current decoding block is determined, and the motion vector group includes three motion vectors, at least one motion vector of the motion vector group may be first determined according to a bitstream. Specifically, when the decoder side determines that some components of the motion model transmission vector are differences between the motion model initialization vector and the motion model optimization vector, and that some components are components in corresponding locations of the motion model optimization vector, the decoder side may determine the at least one motion vector of the motion vector group according to the bitstream. The decoder side decodes the video bitstream, determines a target candidate block of the current decoding block, and determines a motion vector of the target candidate block and a reference frame of the target candidate block. The decoder side separately obtains a picture order count POC of the reference frame of the target candidate block and a picture order count POC of a reference frame of the current decoding block, performs scaling on the motion vector of the target candidate block according to a ratio of the picture order count POC of the reference frame of the current decoding block to the picture order count POC of the reference frame of the target candidate block, and determines a scaled motion vector as a first motion vector in the motion vector group of the current decoding block. A ratio of the first motion vector to the motion vector of the target candidate block is the same as the ratio of the picture order count of the reference frame of the current decoding block to the picture order count of the reference frame of the target candidate block.

Optionally, in an embodiment, an affine motion is used as an example. The motion vector group includes three motion vectors, and the determining a motion vector group of a current decoding block may be determining each motion vector of the motion vector group according to a bitstream. Specifically, when determining that all components of the motion model transmission vector may be differences between the motion model initialization vector and the motion model optimization vector, the decoder side may determine each motion vector of the motion vector group according to the bitstream. The decoder side may first determine a target candidate block of the current decoding block according to an index value in the bitstream, determine a reference frame of the target candidate block as a reference frame of the current decoding block, and use the motion vector of the target candidate block as the first motion vector in the motion vector group of the current decoding block.

In this embodiment of the present application, after the first motion vector in the motion vector group of the current decoding block is determined, a second motion vector in the motion vector group of the current decoding block is determined according to the first motion vector. The second motion vector is a motion vector in the motion vector group different from the first motion vector. Specifically, multiple candidate blocks of the current decoding block are first determined from decoded blocks neighboring around the current decoding block. The multiple candidate blocks are corresponding to a same pixel. Optionally, the pixel may be a vertex of the current decoding block. For example, as shown in FIG. 2, for the current decoding block, the candidate blocks may include D and E, and the multiple candidate blocks do not include the target candidate block, corresponding to the determined first motion vector, of the current decoding block. Then, a reference frame of each candidate block is determined. If the reference frame of the candidate block is not a same frame as the reference frame of the target candidate block corresponding to the first motion vector, that is, the reference frame of the current decoding block, scaling is performed on the motion vector of the candidate block according to a ratio of a picture order count POC of the reference frame of the target candidate block to a picture order count POC of the reference frame of the candidate block, so that the ratio of the picture order count of the reference frame of the current block to the picture order count of the reference frame of the candidate block is the same as a ratio between motion vectors. A scaled motion vector of each candidate block is separately compared with the first motion vector. When the scaled motion vector of the candidate block is different from the first motion vector, and a difference is the smallest, this candidate block is determined as a second target candidate block of the current decoding block, and the scaled motion vector corresponding to this target candidate block is determined as the second motion vector in the motion vector group of the current decoding block.

In this embodiment of the present application, according to the foregoing method, multiple second motion vectors may be determined. For example, when the motion vector group of the current decoding block includes three motion vectors, after the first motion vector in the motion vector group is determined, the other two second motion vectors may be determined according to the foregoing method, and further each motion vector of the motion vector group is determined. However, the present application is not limited thereto.

Optionally, in an embodiment, an affine motion is used as an example. The motion vector group of the current decoding block is determined. The motion vector group includes three motion vectors, and each motion vector of the motion vector group may be determined by decoding a bitstream. Specifically, when determining that all components of the motion model transmission vector may be differences between the motion model initialization vector and the motion model optimization vector, the decoder side may determine each motion vector of the motion vector group according to the bitstream, and directly obtain each motion vector value of the motion vector group of the current decoding block according to the bitstream. In addition, target candidate blocks, of the current decoding block, corresponding to all motion vectors in the motion vector group have a same reference frame, and the reference frame is the reference frame of the current decoding block.

In S220, the prediction values of the first component set of the motion model initialization vector of the current decoding block are determined according to the at least one motion vector of the motion vector group. The motion model initialization vector includes the at least four components. The first component set includes at least one component of the motion model initialization vector. Specifically, an affine motion model is used as an example. The affine model may be represented by using six parameters, and the six parameters may be expressed as $\vec{A}=(a_0, a_1, a_2, a_3, a_4, a_5)^T$. A location, in a reference frame, of each pixel in the current decoding block may be determined according to formula (7), where x and y are coordinate values of any pixel in the current decoding block, x' and y' are coordinate values, at a corresponding prediction point in the reference frame, of the pixel, and $v_x$ and $v_y$ are motion vectors of any pixel in the current decoding block. Formula (8) may be obtained. According to the motion vector group determined in S210, the motion vector group may be expressed as $\{v_0, v_1, v_2\}$, and coordinates of the motion vectors in the motion vector group may be (0,0), (W,0), and (0,H), where W is a width of the current decoding block, and H is a height of the current decoding block. Formula (9) may be obtained by substituting the motion vector group and the coordinates into formula (8), where $v_{xj}$ is an x-directional component of the $j^{th}$ candidate motion vector $v_j$ in a first candidate motion vector group, $v_{yj}$ is a y-directional component of the $j^{th}$ candidate motion vector $v_j$ in the first candidate motion vector group, and j=0, 1, 2. Correspondingly, all the parameters in the affine motion model $\vec{A}=(a_0, a_1, a_2, a_3, a_4, a_5)^T$ may be obtained. As shown in formula (6), the motion vector group of the current decoding block is substituted into formula (6), and the motion model initialization vector $\vec{A}=(a_0, a_1, a_2, a_3, a_4, a_5)^T$ of the current decoding block may be determined. The motion model initialization vector is a six-dimensional vector. Optionally, for another motion model, the initialization vector is a vector including at least four dimensions. The prediction values of the first component set may be determined according to the motion model initialization vector. The prediction values of the first component set may include at least one component of the motion model initialization vector.

In S230, the motion model optimization vector of the current decoding block is determined according to the prediction values of the first component set and the motion model transmission vector, so that the decoder side performs decoding according to the motion model optimization vector. Specifically, the motion model transmission vector of the current decoding block may be expressed as ($\Delta a_0$, $\Delta a_1$, $\Delta a_2$, $\Delta a_3$, $\Delta a_4$, $\Delta a_5$). Transmission values of the first component set may be represented by $\Delta a_0$ and $\Delta a_1$, $\Delta a_0 = a_0' - \bar{a}_0$, and $\Delta a_1 = a_1' - \bar{a}_1$, where $\bar{a}_0$ and $\bar{a}_1$ are numeric values obtained after prediction values $a_0$ and $a_1$ of the first component set are quantized. The other parameter transmission values of the current decoding block may be expressed as ($\Delta a_2$, $\Delta a_3$, $\Delta a_4$, $\Delta a_5) = (\Delta a_2', \Delta a_3', \Delta a_4', \Delta a_5')$, $\Delta a_i'$ may be determined, where $a_i'$ is the motion model optimization vector of the current decoding block.

In this embodiment of the present application, the prediction values $a_0$ and $a_1$ of the first component set may be quantized, to determine the quantized prediction values $\bar{a}_0$ and $\bar{a}_1$ of the first component set. Specifically, an affine motion is used as an example. The motion model initialization vector is determined according to formula (6). In the motion model initialization vector, $a_0$ and $a_1$ are translation motion parameters, and are related to the first motion vector $v_0$ in the motion vector group. $a_0$ and $a_1$ may be determined as the first component set. Optionally, a quantization precision of the two parameters may be $\frac{1}{16}$ or $\frac{1}{4}$. $\frac{1}{16}$ is used as an example. First, $v_0$ is scaled up by four times, so that the precision of $v_0$ is increased from $\frac{1}{4}$ to $\frac{1}{16}$; and then, quantized $a_0$ and $a_1$ whose precision is also $\frac{1}{16}$ are calculated by using $v_0$ whose precision is $\frac{1}{16}$ to obtain $\bar{a}_0$ and $\bar{a}_1$, that is, $\bar{a}_0$ and $\bar{a}_1$ are the quantized prediction values of the first component set.

Optionally, in an embodiment, the prediction value $a_i$ of the first component set of the motion model initialization vector may be determined according to formula (6). The first component set includes all components of the motion model initialization vector, that is, the first component set includes six parameters, so the motion model transmission values of the current decoding block are determined, that is, the transmission values of the first component set are $(\Delta a_0, \Delta a_1, \Delta a_2, \Delta a_3, \Delta a_4, \Delta a_5)$, where $\Delta a_i = a_i' - a_i$, and $a_i'$ is the motion model optimization vector of the current decoding block.

Figure 4:
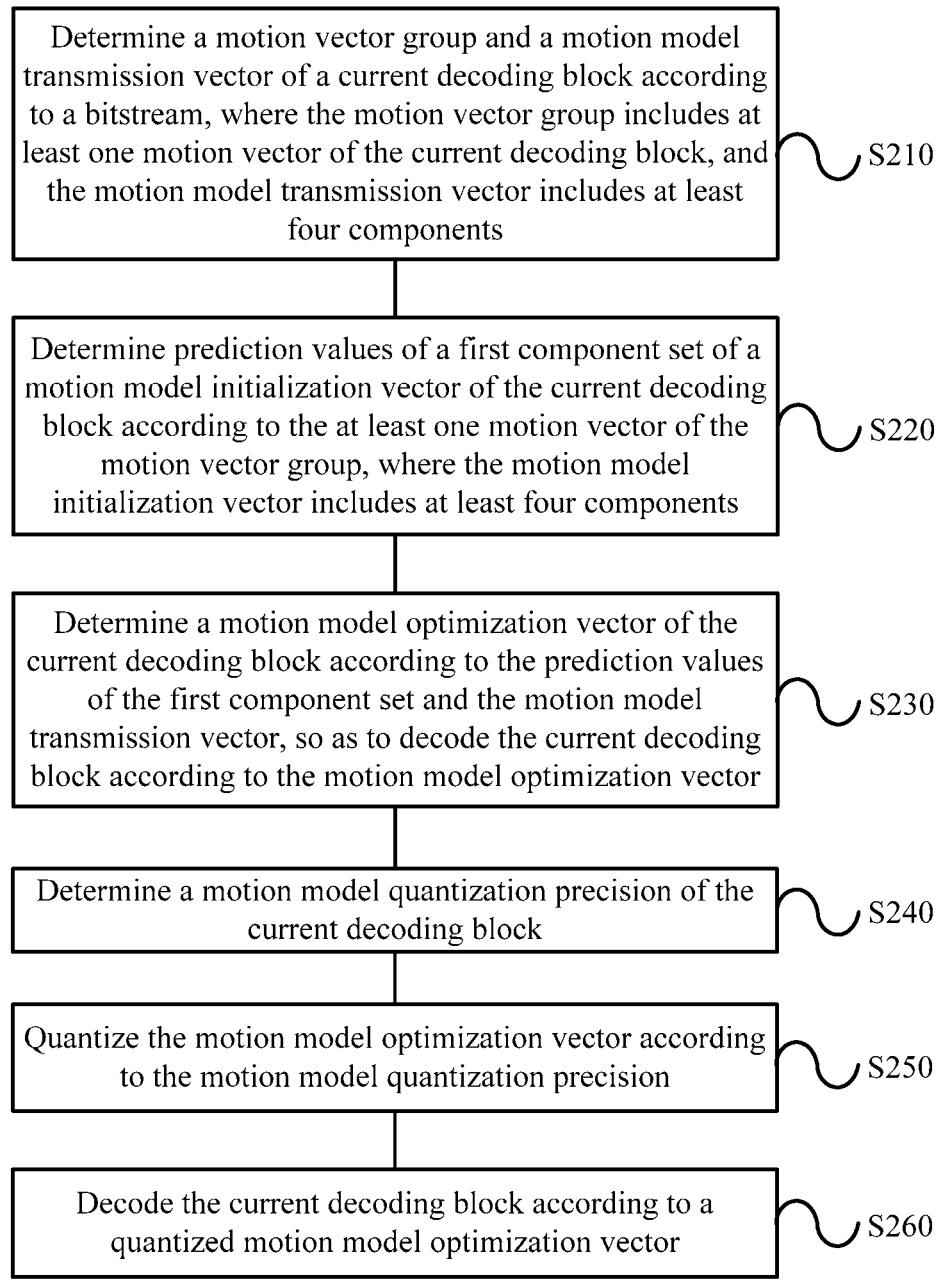
FIG. 4 is another schematic flowchart of a video image decoding method according to another embodiment of the present application.

In an embodiment of the present application, FIG. 4 is another schematic flowchart of a video image decoding method according to this embodiment of the present application. The method shown in FIG. 4 may be executed by a decoding device, such as a decoder. Specifically, as shown in FIG. 4, the method 200 further includes the following steps:

S240. Determine a motion model quantization precision of the current decoding block.

S250. Quantize the motion model optimization vector according to the motion model quantization precision.

S260. Decode the current decoding block according to a quantized motion model optimization vector.

Specifically, the motion model quantization precision may be determined according to the current decoding block; the motion model optimization vector is quantized according to the motion model quantization precision; and parsing, decoding, and reconstruction are performed on the current decoding block according to the quantized motion model optimization vector.

In S240, the motion model quantization precision of the current decoding block is determined. Specifically, the quantization precision may be determined according to a size of the current decoding block and precision information. The size of the current decoding block includes a width of the current decoding block and a height of the current decoding block, and the precision information includes a quantization precision of the motion vector group. Specifically, it can be learnt, according to formula (6), that parameters of the motion model are related to the width and the height of the current decoding block. Therefore, the quantization precision may be determined according to formula (10). 1/P is the quantization precision of the motion vector group of the current decoding block. Optionally, the quantization precision of the motion vector group is generally $\frac{1}{4}$, so $P=4$. W is the width of the current decoding block, and H is the height of the current decoding block. For example, if the width of the current decoding block is 16 and the height is 32, the quantization precision of the motion vector group is $1/(32 \times 4) = \frac{1}{128}$; if the width of the current decoding block is 16 and the height is 8, the quantization precision is $1/(16 \times 4) = \frac{1}{64}$.

In S250, the determined motion model optimization vector is quantized according to the determined quantization precision, to obtain the quantized motion model optimization vector $\vec{A} = (a_0', a_1', a_2', a_3', a_4', a_5')^T$.

In S260, the current decoding block is decoded according to the quantized motion model optimization vector. Specifically, the motion model optimization vector $\vec{A} = (a_0', a_1', a_2', a_3', a_4', a_5')^T$ is substituted into formula (7), and then a reference offset location (x', y') of each pixel with a precision Q in the current decoding block may be obtained. A prediction pixel sample of each pixel sample in the current decoding block is obtained through calculation in the reference offset location. Then, decoding and reconstruction are performed on the prediction pixel sample according to a determined prediction residual, in a received bitstream, of the current decoding block. Optionally, the pixel sample may be one pixel or a small pixel block including multiple pixels. The present application is not limited thereto.

It should be understood that sequence numbers of the foregoing processes do not mean an execution sequence in various embodiments of the present application. The execution sequence of the processes should be determined according to functions and internal logic of the processes, and should not be construed as any limitation on the implementation processes of the embodiments of the present application.

Therefore, according to the video image decoding method in this embodiment of the present application, a motion vector group and a motion model transmission vector of a current decoding block are determined according to a received bitstream; a motion model initialization vector of the current decoding block is determined according to the motion vector group; a motion model optimization vector is determined according to the motion model initialization vector and the motion model transmission vector; and decoding and reconstruction are performed on the motion model optimization vector. In this way, a volume of data and a quantity of occupied bits in encoding and decoding transmission can be reduced. In addition, when the motion model optimization vector is determined and the optimization vector is quantized, a determined quantization precision is determined according to a size of the current decoding block and a quantization precision of a motion vector of the current decoding block. This can also reduce a quantity of bits required in parameter transmission.

To better prove beneficiary effects of this embodiment of the present application compared with the conventional art, this embodiment of the present application is implemented on an encoder based on a latest video encoding standard HEVC. Using HM12.0 as a reference, methods are compared through experiments, and it is found that effects achieved by using the method in this embodiment of the present application is obviously better than those achieved by using the HM12.0 method in Case1.

Refer to Table 1.

TABLE 1

| Class | Sequence | Case1 | Case2 | Case3 | Case4 | Case5 |
|---|---|---|---|---|---|---|
| LDP | Dolphin | 0.0% | −0.5% | −0.4% | −0.6% | −0.7% |
| | City | −3.5% | −5.8% | −4.6% | −5.8% | −3.8% |
| | Crew | −0.1% | −0.3% | −0.1% | −0.6% | −0.6% |
| | Jets | −4.5% | −9.7% | −7.5% | −11.4% | −11.4% |
| | Tractor | −9.9% | −19.4% | −19.9% | −20.7% | −21.1% |
| | Flowervase | −2.1% | −2.8% | −2.9% | −3.2% | −2.4% |
| | BlueSky | −2.2% | −6.4% | −6.1% | −6.8% | −6.3% |
| | TableCard | −2.5% | −5.7% | −5.9% | −6.1% | −6.2% |
| | SpinCalendar | −5.7% | −15.2% | −14.0% | −15.6% | −14.3% |
| Average | All | −3.4% | −7.3% | −6.8% | −7.9% | −7.4% |

Case1: shows a reference comparison result, where a parameter $\vec{A}$ is not predicted, $a_0$, $a_1$ are quantized by using a precision of $1/16$, and $a_2$, $a_3$, $a_4$, $a_5$ are quantized by using a precision of $1/512$.

Case2: shows a reference comparison result, where only parameters $a_0$, $a_1$ are predicted, $a_0$, $a_1$ are quantized by using a precision of $1/16$, and $a_2$, $a_3$, $a_4$, $a_5$ are quantized by using a precision of $1/512$.

Case3: shows a reference comparison result, where parameters $a_0$, $a_1$, $a_2$, $a_3$, $a_4$, $a_5$ are predicted, $a_0$, $a_1$ are quantized by using a precision of $1/16$, and $a_2$, $a_3$, $a_4$, $a_5$ are quantized by using a precision of $1/512$.

Case4: shows a reference comparison result, where only parameters $a_0$, $a_1$ are predicted, $a_0$, $a_1$ are quantized by using a precision of $1/16$, and $a_2$, $a_3$, $a_4$, $a_5$ are quantized by using a precision calculated according to formula (10).

Case5: shows a reference comparison result, where only parameters $a_0$, $a_1$ are predicted, $a_0$, $a_1$ are quantized by using a precision of $1/4$, and $a_2$, $a_3$, $a_4$, $a_5$ are quantized by using a precision calculated according to formula (10).

Therefore, according to the video image encoding method and the video image decoding method in the embodiments of the present application, an encoder side determines a motion vector group of a current encoding block, determines a motion model initialization vector of the current encoding block according to the motion vector group, determines to-be-transmitted values of a motion model according to the motion model initialization vector, and encodes the to-be-transmitted values of the motion model for transmission; and a decoder side determines the to-be-transmitted values of the motion model according to a received bitstream, and performs decoding and reconstruction according to the motion model transmission values. In this way, a volume of data and a quantity of occupied bits in encoding and decoding transmission can be reduced.

In the foregoing, with reference to FIG. 1 to FIG. 4, the video image encoding method and the video image decoding method are described in detail according to the embodiments of the present application. In the following, with reference to FIG. 5 and FIG. 6, an encoding device and a decoding device are described according to embodiments of the present application.

Figure 5:
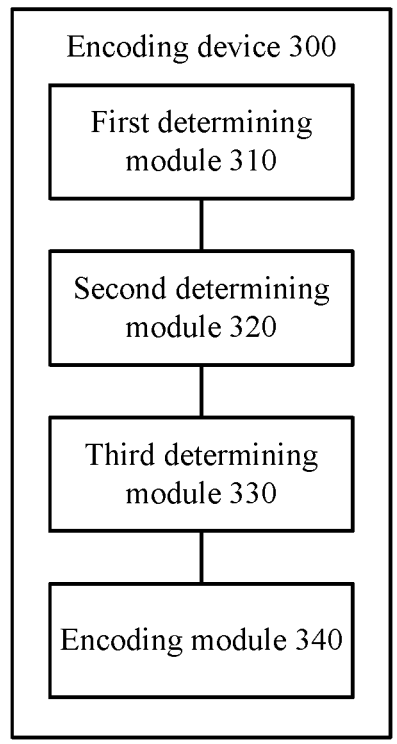
FIG. 5 is a schematic block diagram of an encoding device according to an embodiment of the present application.

FIG. 5 is a schematic block diagram of an encoding device 300 according to an embodiment of the present application. The encoding device may be user equipment; or may be a network device, such as an RNC or an eNB. As shown in FIG. 5, the encoding device 300 includes:

a first determining module 310, configured to determine a motion vector group of a current encoding block, where the motion vector group includes at least one motion vector of the current encoding block;

a second determining module 320, configured to determine prediction values of a first component set of a motion model initialization vector of the current encoding block according to the at least one motion vector of the motion vector group, where the motion model initialization vector includes at least four components;

a third determining module 330, configured to determine to-be-transmitted values of the first component set according to the prediction values of the first component set; and an encoding module 340, configured to encode the to-be-transmitted values of the first component set, and transmit encoded to-be-transmitted values of the first component set to a decoder side.

Specifically, the first determining module 310 determines the motion vector group of the current encoding block, where the motion vector group includes at least one motion vector corresponding to a pixel in the current encoding block. The second determining module 320 determines the prediction values of the first component set of the motion model initialization vector of the current encoding block according to the at least one motion vector of the motion vector group, where the motion model initialization vector includes at least four components, and the first component set includes at least one component of the motion model initialization vector; and then determines a motion model quantization precision and a motion model optimization vector according to the current encoding block, and quantizes the motion model optimization vector according to the quantization precision. The third determining module 330 may determine the to-be-transmitted values of the first component set according to the prediction values of the first component set of the motion model initialization vector and a quantized motion model optimization vector, encode the to-be-transmitted values of the first component set, and transmit the encoded to-be-transmitted values to the decoder side, so that the decoder side performs a decoding operation. The third determining module 330 may further determine a prediction sample of the current encoding block according to the quantized motion model optimization vector, and encode the current encoding block according to the prediction sample for transmission.

Therefore, the encoding device in this embodiment of the present application determines a motion vector group of a current encoding block; determines a motion model initialization vector of the current encoding block according to the motion vector group; determines to-be-transmitted values of a motion model according to the motion model initialization vector; and encodes the to-be-transmitted values of the motion model for transmission, so that a decoder side performs decoding according to the to-be-transmitted values of the motion model. In this way, a volume of data and a quantity of occupied bits in encoding and decoding transmission can be reduced.

In this embodiment of the present application, for a video image encoding process in all encoding standards, with regard to inter prediction, multiple motion models may be used in a motion compensation computation process, such as an affine motion model, a general motion model, or a perspective model. Herein, the affine motion model is used as an example for description, but the present application is not limited thereto.

In this embodiment of the present application, the first determining module 310 determines the motion vector group of the current encoding block, and the motion vector group includes at least one motion vector corresponding to a pixel in the current encoding block. A quantity of parameters required for describing a motion model varies between motion models. For a motion model having 2n parameters, the motion vector group of the current encoding block may generally include n motion vectors. For example, for an affine motion, when all pixels in the current encoding block are represented by using the affine motion model, generally, the affine motion model may be expressed as $\vec{A}=(a_0, a_1, a_2, a_3, a_4, a_5)^T$. That is, the affine motion model has six parameters, and the motion vector group includes at least three motion vectors. For a general motion model, 12 parameters are generally used, and the motion vector group includes at least six motion vectors. Optionally, determining at least one motion vector of the motion vector group may be determining one motion vector of the motion vector group, or determining n motion vectors or all motion vectors of the motion vector group. For example, for the affine motion, the motion vector group may include at least three motion vectors, and the determining a motion vector group of a current encoding block may be determining one motion vector, three motion vectors, or all motion vectors of the motion vector group. The present application is not limited thereto.

Optionally, in an embodiment, an affine motion is used as an example. The motion vector group includes three motion vectors, and that the first determining module 310 determines a motion vector group of a current encoding block may be determining at least one motion vector of the motion vector group. For an HEVC (High Efficiency Video Coding) standard, a first motion vector in the motion vector group of the current encoding block may be determined by using an AMVP (Advanced Motion Vector Prediction) technology. Specifically, first, multiple candidate blocks of the current encoding block are determined from encoded blocks neighboring around the current encoding block. The multiple candidate blocks may be determined according to coordinate locations, and the multiple candidate blocks are adjacent to the current encoding block. For example, as shown in FIG. 2, for the current encoding block, generally, A to G may be determined as the multiple candidate blocks of the current encoding block. Then, a matching error value between a prediction block corresponding to a motion vector of each candidate block and the current encoding block is determined. Specifically, the prediction block corresponding to the motion vector of the candidate block is determined in a reference frame according to the motion vector of the candidate block and the current encoding block; and then, the matching error value between the prediction block and the current encoding block is calculated, and a candidate block corresponding to a smallest matching error value is determined as a target candidate block of the current encoding block. Next, a picture order count (POC) of a reference frame of the current encoding block and a picture order count (POC) of a reference frame of the target candidate block are separately determined. Scaling is performed on a motion vector of the target candidate block according to a ratio of the picture order count (POC) of the reference frame of the current encoding block to the picture order count (POC) of the reference frame of the target candidate block. A scaled motion vector of the target candidate block is determined as the first motion vector in the motion vector group of the current encoding block. A ratio of the first motion vector to the motion vector of the target candidate block is the same as the ratio of the picture order count of the reference frame of the current encoding block to the picture order count of the reference frame of the target candidate block.

In this embodiment of the present application, the determined motion vector of the target candidate block may be determined as a searching start point in subsequent motion estimation. The encoding device may encode an index value corresponding to the target candidate block, and transmit the encoded index value to the decoder side, so that the decoder side performs decoding and determines the target candidate block and the motion vector of the target candidate block.

In this embodiment of the present application, the first determining module 310 may determine, according to the following method, the matching error value between the prediction block corresponding to the motion vector of each candidate block and the current encoding block. Specifically, for each pixel in the current encoding block, a matching error value of each pixel may be determined according to formulas (1) to (4), where $s(x_i, y_j)$ is an original pixel value of the pixel, $s'(x_i, y_j)$ is a prediction pixel value of the pixel in a frame to which a motion vector of the candidate block points, $x_i$ and $y_i$ are coordinate values of the pixel, $Gx_i$ is a horizontal gradient of a location of the pixel, and $Gy_i$ is a vertical gradient of the location of the pixel. These gradients may be obtained through calculation by using a Sobel (Sobel) operator.

In this embodiment of the present application, the first determining module 310 may determine, according to formulas (1) to (4), a matching error value of each pixel in the current encoding block relative to the prediction block corresponding to the motion vector of the candidate block, and add up absolute values of the matching error values of all the pixels in the current encoding block. The matching error value between the current encoding block and the prediction block corresponding to the candidate block may be obtained. However, the present application is not limited thereto. According to the foregoing method, the matching error value between the current encoding block and the prediction block corresponding to each candidate block is sequentially determined. A candidate block corresponding to a smallest matching error value is used as the target candidate block of the current encoding block.

Optionally, in an embodiment, an affine motion is used as an example. The first determining module 310 determines the motion vector group of the current encoding block. The motion vector group includes three motion vectors. After one motion vector, namely, the first motion vector, of the motion vector group is determined according to the foregoing method, as shown in FIG. 2, the first motion vector may be a motion vector corresponding to a vertex of the current encoding block. Optionally, motion vectors of two vertexes adjacent to the vertex of the current encoding block may be selected as the other motion vectors in the motion vector group. The motion vector group may be expressed as $\{v_0, v_1, v_2\}$, and coordinates of the motion vectors in the motion vector group are (0,0), (W,0), and (0,H), where W is a width of the current encoding block, and H is a height of the current encoding block.

Optionally, in an embodiment, an affine motion is used as an example. The motion vector group includes three motion vectors, and that the first determining module 310 determines a motion vector group of a current encoding block may be determining each motion vector of the motion vector group. Specifically, first, multiple encoded blocks neighboring around the current encoding block may be determined as multiple candidate blocks. The multiple candidate blocks are corresponding to a same pixel in the current encoding block. Optionally, the pixel may be a vertex of the current encoding block. For example, as shown in FIGS. 2, A, B, and C may be determined as the multiple candidate blocks of the current encoding block. According to formulas (1) to (4), a matching error value of each pixel in the current encoding block relative to a prediction block corresponding to the motion vector of each candidate block is separately determined. Then, absolute values of the matching error values of all pixels are added up. A matching error value of each candidate block relative to the current encoding block is determined. A candidate block corresponding to a smallest matching error value is selected as a target candidate block of the current encoding block. A motion vector of the target candidate block is determined as the first motion vector in the motion vector group of the current encoding block. A reference frame of the target candidate block is determined as a reference frame of the current encoding block. The motion vector of the target candidate block is used as the first motion vector of the current encoding block, and the first motion vector may be used as a searching start point in subsequent motion estimation. The encoding device may encode an index value corresponding to the target candidate block, and transmit the encoded index value to the decoder side, so that the decoder side performs decoding and determines the target candidate block and the motion vector of the target candidate block.

In this embodiment of the present application, after determining the first motion vector in the motion vector group of the current encoding block, the first determining module 310 determines a second motion vector in the motion vector group of the current encoding block according to the first motion vector. The second motion vector is a motion vector in the motion vector group different from the first motion vector. Specifically, first, multiple candidate blocks of the current encoding block are determined from encoded blocks neighboring around the current encoding block. The multiple candidate blocks are corresponding to a same pixel in the current encoding block. Optionally, the pixel may be a vertex of the current encoding block. The pixel is different from the pixels corresponding to the multiple candidate blocks in determining the first motion vector. For example, as shown in FIG. 2, the candidate blocks may include D and E, and the multiple candidate blocks do not include the candidate block in determining the first motion vector. Then, a reference frame of each candidate block is determined. If the reference frame of the candidate block is not a same frame as the reference frame of the target candidate block corresponding to the first motion vector, that is, the reference frame of the current encoding block, scaling is performed on the motion vector of the candidate block according to a ratio of a picture order count POC of the reference frame of the target candidate block to a picture order count POC of the reference frame of the candidate block, so that the ratio of the picture order count of the reference frame of the current block to the picture order count of the reference frame of the candidate block is the same as a ratio between motion vectors. A scaled motion vector of each candidate block is separately compared with the first motion vector. When the scaled motion vector of the candidate block is different from the first motion vector, and a difference is the smallest, this candidate block is determined as a second target candidate block of the current encoding block, and the scaled motion vector corresponding to this target candidate block is determined as the second motion vector in the motion vector group of the current encoding block.

In this embodiment of the present application, the first determining module 310 may determine multiple second motion vectors according to the foregoing method. For example, when the motion vector group of the current encoding block includes three motion vectors, after one first motion vector of the motion vector group is determined, the other two second motion vectors may be determined according to the foregoing method. However, the present application is not limited thereto.

Optionally, in an embodiment, an affine motion is used as an example. The first determining module 310 determines the motion vector group of the current encoding block. The motion vector group includes three motion vectors, and each motion vector of the motion vector group may be further determined according to the following method. Specifically, multiple candidate blocks of the current encoding block are determined. All the multiple candidate blocks are encoded blocks adjacent to the current encoding block. For example, as shown in FIG. 2, A to F are the multiple candidate blocks of the current encoding block. Then, multiple candidate motion vector groups of the current encoding block are determined according to the multiple candidate blocks. Each candidate motion vector group includes three motion vectors, and the three motion vectors are corresponding to three pixels in the current encoding block. Optionally, motion vectors of several candidate blocks that are selected from the multiple candidate blocks may be used as the candidate motion vector group. For example, as shown in FIG. 2, for the multiple candidate blocks A to F, three motion vectors, including a motion vector of a block randomly selected from the candidate blocks A, B, and C that are corresponding to a same pixel, a motion vector of a block randomly selected from D and E that are corresponding to another pixel, and a motion vector of a block randomly selected from F and G that are corresponding to another pixel, may constitute a candidate motion vector group. As there are different selections, these candidate blocks can constitute 12 candidate motion vector groups. A reference frame of each motion vector of a first candidate motion vector group is determined. The first candidate motion vector group is any candidate motion vector group of the multiple candidate motion vector groups. Proportional scaling is performed on an index number and a picture order count of a reference frame of a candidate block corresponding to each motion vector of the first candidate motion vector group, so that the three motion vectors of the first candidate motion vector group are corresponding to a same reference frame index number and picture order count.

In this embodiment of the present application, the first determining module 310 may determine a prediction location, in the reference frame of the first candidate motion vector group, of each pixel in the current encoding block according to formulas (5) and (6), where W is a width of the current encoding block, H is a height of the current encoding block, $v_{xj}$ is an x-directional component of the $j^{th}$ candidate motion vector $v_j$ in the first candidate motion vector group, $v_{yj}$ is a y-directional component of the $j^{th}$ candidate motion vector $v_j$ in the first candidate motion vector group, j=0, 1, 2, x and y are coordinate values of each pixel in the current encoding block, and x' and y' are coordinate values, at a prediction point corresponding to the reference frame in the first candidate motion vector group, of the pixel.

According to the coordinate values of each pixel in the current encoding block and the coordinate values of the pixel, at the prediction point corresponding to the reference frame, in the current encoding block, for the first candidate motion vector group, a matching error value between each pixel in the current encoding block and the prediction point corresponding to the reference frame of the first candidate motion vector group is determined according to formula (1), where $\vec{A}=(a_0, a_1, a_2, a_3, a_4, a_5)^T$. An absolute value of the matching error value of each pixel relative to the first candidate motion vector group is calculated, and the absolute values are added up, to determine a matching error value of the first candidate motion vector group corresponding to the current encoding block. Similarly, a matching error value of the current encoding block relative to each candidate motion vector group is determined, and the candidate motion vector group corresponding to a smallest value in multiple matching error values corresponding to multiple candidate motion vector groups is determined as the motion vector group of the current encoding block. An index value of the motion vector group is encoded and transmitted to the decoder side, so that the decoder side determines the motion vector group according to the index value.

In this embodiment of the present application, for the motion vector group determined by the first determining module 310, any motion vector of the motion vector group may be used as a searching start point in subsequent motion estimation. Optionally, as shown in FIG. 2, a prediction location of a vertex in the upper-left corner of the current encoding block may be used as the searching start point in subsequent motion estimation. The present application is not limited thereto.

In this embodiment of the present application, the second determining module 320 determines the prediction values of the first component set of the motion model initialization vector of the current encoding block according to the at least one motion vector of the motion vector group. The motion model initialization vector includes the at least four components. The first component set includes at least one component of the motion model initialization vector. Specifically, an affine motion model is used as an example. The affine model may be represented by using six parameters, and the six parameters may be expressed as $\vec{A}=(a_0, a_1, a_2, a_3, a_4, a_5)^T$. A location, in a reference frame, of each pixel in the current encoding block may be determined according to formula (7), where x and y are coordinate values of any pixel in the current encoding block, x' and y' are coordinate values, at a corresponding prediction point in the reference frame, of the pixel, and $v_x$ and $v_y$ are motion vectors of any pixel in the current encoding block. Formula (8) may be obtained. According to the motion vector group determined by the first determining module 310, the motion vector may be expressed as $\{v_0, v_1, v_2\}$. Target candidate blocks corresponding to the motion vector group are blocks A to G shown in FIG. 2. Therefore, coordinates of the motion vectors in the motion vector group may be (0,0), (W,0), and (0,H), where W is a width of the current encoding block, and H is a height of the current encoding block. Formula (9) may be obtained by substituting the motion vector group and the coordinates into formula (8), where $v_{xj}$ is an x-directional component of the $j^{th}$ candidate motion vector $v_j$ in a first candidate motion vector group, $v_{yj}$ is a y-directional component of the $j^{th}$ candidate motion vector $v_j$ in the first candidate motion vector group, and j=0, 1, 2. Correspondingly, all the parameters in the affine motion model $\vec{A}=(a_0, a_1, a_2, a_3, a_4, a_5)^T$ may be obtained. As shown in formula (6), the motion vector group $\{v_0, v_1, v_2\}$ of the current encoding block is substituted into formula (6), and the motion model initialization vector $\vec{A}=(a_0, a_1, a_2, a_3, a_4, a_5)^T$ of the current encoding block may be determined. The motion model initialization vector is a six-dimensional vector. Optionally, for another motion model, the initialization vector is a vector including at least four dimensions. The prediction values of the first component set may be determined according to the motion model initialization vector. The prediction values of the first component set may include at least one component of the motion model initialization vector.

In this embodiment of the present application, the third determining module 330 determines the to-be-transmitted values of the first component set according to the prediction values of the first component set. Specifically, the third determining module 330 may determine the motion model quantization precision and the motion model optimization vector according to the current encoding block, quantize the motion model optimization vector according to the motion model quantization precision, and determine the to-be-transmitted values of the first component set according to the prediction values of the first component set of the motion model and a quantized motion model optimization vector.

In this embodiment of the present application, the third determining module 330 may first determine the motion model optimization vector. Optionally, the motion model optimization vector may be determined according to the conventional art. Specifically, a matching error value of the current encoding block may be determined according to formulas (1) to (4). A prediction block of the current encoding block is searched for in a gradient iterative manner within a specific range of a reference frame of the current encoding block. A prediction block corresponding to a smallest matching error value is determined as the prediction block of the current encoding block, and a corresponding motion model parameter $\vec{A}=(a_0', a_1', a_2', a_3', a_4', a_5')^T$ in this case is determined as the optimization vector of the current encoding block according to formula (4).

Optionally, the third determining module 330 may further determine the motion model initialization vector of the current encoding block according to formula (6), and determine the motion model initialization vector as the motion model optimization vector.

Optionally, the motion model initialization vector of the current encoding block may be further determined according to formula (6). A corresponding location, in a reference frame, of each pixel in the current encoding block is obtained through calculation according to formula (7). The matching error value of the current encoding block is calculated according to formula (1) and (6). This matching error value is compared with the matching error value that is corresponding to the motion model parameter and that is determined according to formulas (1) to (4) and the conventional art. A motion model parameter $\vec{A}=(a_0', a_1', a_2', a_3', a_4', a_5')^T$ corresponding to a smallest matching error value is selected as the optimization vector of the current encoding block. The present application is not limited thereto.

In this embodiment of the present application, the third determining module 330 further needs to determine the motion model quantization precision, so as to quantize the motion model optimization vector. Specifically, the motion model optimization vector includes two translation motion parameters $a_0'$ and $a_1'$. A quantization precision of the two translation motion parameters may be 1/16 or 1/4. The present application is not limited thereto. A quantization precision of the other parameters ($a_2'$, $a_3'$, $a_4'$, $a_5'$) in the motion model optimization vector may be 1/512. Alternatively, the quantization precision may be determined according to a size of the current encoding block and precision information. The size of the current encoding block includes a width of the current encoding block and a height of the current encoding block, and the precision information may include a quantization precision of the motion vector group of the current encoding block. Specifically, it can be learnt, according to formula (6), that the latter four parameters in the motion model are related to the width and the height of the current encoding block. Therefore, the quantization precision may be determined according to formula (10). P may be determined according to the precision information of the current encoding block. Specifically, 1/P is the quantization precision of the motion vector group of the current encoding block. Optionally, the quantization precision of the motion vector group is generally ¼, so P=4. W is the width of the current encoding block, and H is the height of the current encoding block. For example, if the width of the current encoding block is 16 and the height is 32, the quantization precision of the motion vector group is 1/(32×4)=1/128; if the width of the encoding block is 16 and the height is 8, the quantization precision is 1/(16×4)=1/64.

In this embodiment of the present application, the third determining module 330 quantizes the motion model optimization vector $\vec{A}=(a_0', a_1', a_2', a_3', a_4', a_5')^T$ according to the determined quantization precision, to obtain a quantized motion model optimization vector $\overline{A}=(\overline{a}_0', a_1', a_2', a_3', a_4', a_5')^T$.

In this embodiment of the present application, the third determining module 330 determines the to-be-transmitted values of the first component set according to the prediction values of the first component set and the quantized motion model optimization vector. Specifically, the determining may be performed by using the following method. Herein, an affine motion is used as an example. The motion model initialization vector is determined according to formula (6). In the motion model initialization vector, $a_0$ and $a_1$ are translation motion parameters, and are related to the first motion vector $a_0$ in the motion vector group. $a_0$ and $a_1$ may be determined as the first component set, and values $a_0$ and $a_1$ that are determined according to formula (6) are the prediction values of the first component set. Optionally, a quantization precision of the two parameters may be 1/16 or ¼. 1/16 is used as an example. First, $v_0$ is scaled up by four times, so that the precision of $v_0$ is increased from ¼ to 1/16. Then, quantized $a_0$ and $a_1$ whose precision is also 1/16 are calculated by using $v_0$ whose precision is 1/16, to obtain $\overline{a}_0$ and $\overline{a}_1$, that is, $\overline{a}_0$ and $\overline{a}_1$ are quantized prediction values of the first component set.

In this embodiment of the present application, the third determining module 330 determines the to-be-transmitted values of the first component set of the current encoding block according to the quantized prediction values $\overline{a}_0$ and $\overline{a}_1$ of the first component set and the determined motion model optimization vector. The motion model transmission values of the current encoding block may be ($\Delta a_0$, $\Delta a_1$, $\Delta a_2$, $\Delta a_3$, $\Delta a_4$, $\Delta a_5$). The first component set may include two components. The transmission values of the first component set may be $\Delta a_0$ and $\Delta a_1$, $\Delta a_0 = \overline{a}_0' - \overline{a}_0$, and $\Delta a_1 = \overline{a}_1' - \overline{a}_1$. The other transmission values are ($\Delta a_2$, $\Delta a_3$, $\Delta a_4$, $\Delta a_5$)=($\Delta a_2'$, $\Delta a_3'$, $\Delta a_4'$, $\Delta a_5'$), $\overline{a}_i'$ is the quantized motion model optimization vector, and $\overline{a}_0$ and $\overline{a}_1$ are the quantized values of the prediction values $a_0$ and $a_1$ of the first component set. In this case, two parameters in encoding transmission parameters are differences between a quantized first component set and the motion model optimization vector. The differences are less than a quantity of bits occupied by a quantized motion model optimization vector in direct encoding transmission. This reduces a volume of transmitted data.

Optionally, in an embodiment, the third determining module 330 determines the to-be-transmitted values of the first component set according to the prediction values of the first component set and the quantized motion model optimization vector. Specifically, the determining may be further performed according to the following method. According to formula (6), six components $a_i$ of the motion model initialization vector are determined, where i=0, 1, 2, 3, 4, 5. Then, it is determined that the first component set also includes six parameters, and the motion model transmission values of the current encoding block may be determined, that is, the transmission values of the first component set are ($\Delta a_0$, $\Delta a_1$, $\Delta a_2$, $\Delta a_3$, $\Delta a_4$, $\Delta a_5$), where $\Delta a_i = \overline{a}_i' - a_i$, $\overline{a}_i'$ is the quantized motion model optimization vector, and $a_i$ is the prediction value of the first component set.

In this embodiment of the present application, the encoding module 340 may encode the to-be-transmitted values of the first component set determined by the third determining module 330, and transmit the encoded to-be-transmitted values of the first component set to the decoder side. Specifically, the encoding module 340 may encode the motion model to-be-transmitted vector of the current encoding block, and transmit the encoded the motion model to-be-transmitted vector of the current encoding block to the decoder side. In addition, the encoding module 340 may further quantize the motion model optimization vector according to the motion model quantization precision determined by the third determining module 330; determine a prediction pixel sample of each pixel sample of the current encoding block; and further determine a prediction residual of the current encoding block, encode the prediction residual, and transmit the encoded prediction residual to the decoder side. Specifically, for the motion model optimization vector $\vec{A}=(a_0', a_1', a_2', a_3', a_4', a_5')^T$, each parameter $a_i'$ is quantized according to the motion model quantization precision determined according to formula (10), to obtain a quantized motion model optimization vector $\vec{A}$. The quantized motion model optimization vector is substituted into formula (7), and a reference offset location (x', y') of each pixel with a precision Q in the current encoding block may be obtained. The prediction pixel sample of each pixel sample in the current encoding block is obtained through calculation in the reference offset location. Further, the prediction residual of the current encoding block is determined, and the prediction residual is encoded and transmitted to the decoder side. Optionally, the pixel sample may be one pixel or a small pixel block including multiple pixels. The present application is not limited thereto.

It should be understood that the encoding device 300 according to this embodiment of the present application may be correspondingly configured to execute the video image encoding method 100 in the embodiment of the present application. In addition, the foregoing and other operations and/or functions of the modules in the encoding device 300 are intended to implement corresponding processes of the methods in FIG. 1 and FIG. 2. For brevity, details are not further described herein.

Therefore, the encoding device in this embodiment of the present application determines a motion vector group of a current encoding block; determines a motion model initialization vector of the current encoding block according to the motion vector group; determines to-be-transmitted values of a motion model according to the motion model initialization vector; and encodes the the to-be-transmitted values of the motion model for transmission, so that a decoder side performs decoding according to the to-be-transmitted values of the motion model. In this way, a volume of data and a quantity of occupied bits in encoding and decoding transmission can be reduced. In addition, when the motion model optimization vector is determined and the optimization vector is quantized, a determined quantization precision is determined according to a size of the current encoding block and a quantization precision of a motion vector of the current encoding block. This can also reduce a quantity of bits required by an encoding parameter.

Figure 6:
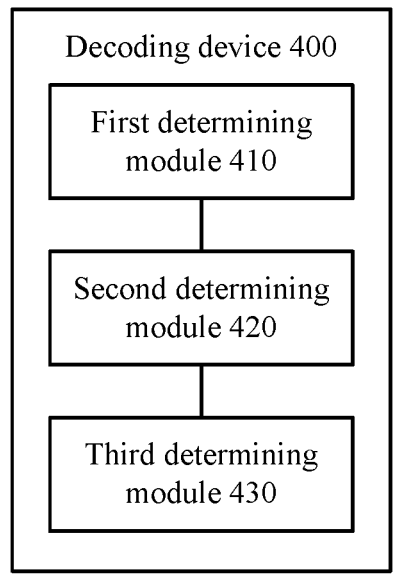
FIG. 6 is a schematic block diagram of a decoding device according to an embodiment of the present application.

FIG. 6 is a schematic block diagram of a decoding device 400 according to an embodiment of the present application. The decoding device may be user equipment; or may be a network device, such as an RNC or an eNB. As shown in FIG. 6, the decoding device 400 includes:

a first determining module 410, configured to determine a motion vector group and a motion model transmission vector of a current decoding block according to a bitstream, where the motion vector group includes at least one motion vector of the current decoding block, and the motion model transmission vector includes at least four components;

a second determining module 420, configured to determine prediction values of a first component set of a motion model initialization vector of the current decoding block according to the at least one motion vector of the motion vector group, where the motion model initialization vector includes at least four components; and a third determining module 430, configured to determine a motion model optimization vector of the current decoding block according to the prediction values of the first component set and the motion model transmission vector, so as to decode the current decoding block according to the motion model optimization vector.

Specifically, the first determining module 410 of a decoder side receives the bitstream transmitted by an encoder side, performs decoding according to the bitstream, and determines the motion vector group of the current decoding block and the motion model transmission vector. The motion vector group includes at least one motion vector corresponding to a pixel in the current decoding block. The second determining module 420 determines the prediction values of the first component set of the motion model initialization vector of the current decoding block according to the at least one motion vector of the motion vector group. The motion model initialization vector includes the at least four components. The first component set includes at least one component of the motion model initialization vector. The third determining module 430 determines the motion model optimization vector of the current decoding block according to the prediction values of the first component set and the motion model transmission vector. Then, the third determining module 430 determines a prediction sample of the current decoding block according to a quantized motion model optimization vector, and performs decoding and reconstruction on the current decoding block according to the prediction sample.

Therefore, the decoding device in this embodiment of the present application determines a motion vector group and a motion model transmission vector of a current decoding block according to a received bitstream; determines a motion model initialization vector of the current decoding block according to the motion vector group; determines a motion model optimization vector according to the motion model initialization vector and the motion model transmission vector; and decodes and reconstructs the motion model optimization vector. In this way, a volume of data and a quantity of occupied bits in encoding and decoding transmission can be reduced.

In this embodiment of the present application, the decoding device performs decoding according to the bitstream. The first determining module 410 determines the motion vector group of the current decoding block and the motion model transmission vector. The motion vector group includes at least one motion vector of the current decoding block, and each motion vector is corresponding to one pixel in the current decoding block. Optionally, a quantity of parameters required for describing a motion model varies between motion models. For a motion model having 2n parameters, the motion model transmission vector determined by the decoder side is a 2n-dimensional vector, and the motion vector group of the current decoding block may generally include n motion vectors. For example, for an affine motion, when all pixels in the current decoding block are represented by using the affine motion model, generally, the affine motion model may be expressed as $\vec{A}=(a_0, a_1, a_2, a_3, a_4, a_5)^T$. That is, the affine motion model has six parameters, and the motion vector group may include three motion vectors. For a general motion model, 12 parameters are generally used, and the motion vector group may include six motion vectors. Optionally, the determining a motion vector group may be determining at least one motion vector of the motion vector group, or determining one motion vector of the motion vector group, or determining n motion vectors or all motion vectors of the motion vector group. For example, for the affine motion, the motion vector group may include at least three motion vectors, and the determining a motion vector group of a current decoding block may be determining one motion vector, three motion vectors, or all motion vectors of the motion vector group. According to a quantity of motion vectors determined by an encoder side, the decoder side also accordingly determines a corresponding quantity of motion vectors. The present application is not limited thereto.

In this embodiment of the present application, the first determining module 410 of the decoding device may determine the motion model transmission vector and the motion vector group of the current decoding block according to the received bitstream. Specifically, the decoder side may first determine the motion model transmission vector of the current decoding block according to the received bitstream. All components of the motion model transmission vector may be differences between the motion model initialization vector and the motion model optimization vector. Alternatively, some components of the motion model transmission vector are differences between the motion model initialization vector and the motion model optimization vector, and some components are components in corresponding locations of the motion model optimization vector. The present application is not limited thereto.

Optionally, in an embodiment, an affine motion is used as an example. When the first determining module 410 determines the motion vector group of the current decoding block, and the motion vector group includes three motion vectors, at least one motion vector of the motion vector group may be first determined according to the bitstream. Specifically, when the first determining module 410 of the decoding device determines that some components of the motion model transmission vector are differences between the motion model initialization vector and the motion model optimization vector, and that some components are components in corresponding locations of the motion model optimization vector, the decoder side may determine the at least one motion vector of the motion vector group according to the bitstream. The decoder side decodes the video bitstream, determines a target candidate block of the current decoding block, and determines a motion vector of the target candidate block and a reference frame of the target candidate block. The decoder side separately obtains a picture order count POC of the reference frame of the target candidate block and a picture order count POC of a reference frame of the current decoding block; performs scaling on the motion vector of the target candidate block according to a ratio of the picture order count POC of the reference frame of the current decoding block to the picture order count POC of the reference frame of the target candidate block, so that the ratio of the picture order count POC of the reference frame of the target candidate block to the picture order count POC of the reference frame of the current decoding block is the same as a ratio of the motion vector before scaling to the motion vector after scaling; and then determines a scaled motion vector as a first motion vector in the motion vector group of the current decoding block. A ratio of the first motion vector to the motion vector of the target candidate block is the same as the ratio of the picture order count of the reference frame of the current decoding block to the picture order count of the reference frame of the target candidate block.

Optionally, in an embodiment, an affine motion is used as an example. The first determining module 410 determines the motion vector group of the current decoding block. The motion vector group includes three motion vectors, and each motion vector of the motion vector group may be determined according to a bitstream. Specifically, when determining that all components of the motion model transmission vector may be differences between the motion model initialization vector and the motion model optimization vector, the first determining module 410 of the decoder side may determine each motion vector of the motion vector group according to the bitstream. A target candidate block of the current decoding block may be first determined according to an index value in the bitstream. A reference frame of the target candidate block is determined as a reference frame of the current decoding block. A motion vector of the target candidate block is determined as the first motion vector in the motion vector group of the current decoding block.

In this embodiment of the present application, after determining the first motion vector in the motion vector group of the current decoding block, the first determining module 410 determines a second motion vector in the motion vector group of the current decoding block according to the first motion vector. The second motion vector is a motion vector in the motion vector group different from the first motion vector. Specifically, multiple candidate blocks of the current decoding block are first determined from decoded blocks neighboring around the current decoding block. The multiple candidate blocks are corresponding to a same pixel. Optionally, the pixel may be a vertex of the current decoding block. For example, as shown in FIG. 2, for the current decoding block, the candidate blocks may include D and E, and the multiple candidate blocks do not include the target candidate block of the determined first motion vector. Then, a reference frame of each candidate block is determined. If the reference frame of the candidate block is not a same frame as the reference frame of the target candidate block corresponding to the first motion vector, that is, the reference frame of the current decoding block, scaling is performed on the motion vector of the candidate block according to a ratio of a picture order count POC of the reference frame of the target candidate block to a picture order count POC of the reference frame of the candidate block, so that the ratio of the picture order count of the reference frame of the current block to the picture order count of the reference frame of the candidate block is the same as a ratio between motion vectors. A scaled motion vector of each candidate block is separately compared with the first motion vector. When the scaled motion vector of the candidate block is different from the first motion vector, and a difference is the smallest, this candidate block is determined as a second target candidate block of the current decoding block, and the scaled motion vector corresponding to this target candidate block is determined as the second motion vector in the motion vector group of the current decoding block.

In this embodiment of the present application, according to the foregoing method, the first determining module 410 may determine multiple second motion vectors. For example, when the motion vector group of the current decoding block includes three motion vectors, after the first motion vector in the motion vector group is determined, the other two second motion vectors may be determined according to the foregoing method, and further each motion vector of the motion vector group is determined. However, the present application is not limited thereto.

Optionally, in an embodiment of the present application, in an embodiment, an affine motion is used as an example. The first determining module 410 determines the motion vector group of the current decoding block. The motion vector group includes three motion vectors, and each motion vector of the motion vector group may be further determined according to a bitstream. Specifically, when determining that all components of the motion model transmission vector may be differences between the motion model initialization vector and the motion model optimization vector, the decoder side may determine each motion vector of the motion vector group according to the bitstream, and directly obtain each motion vector value of the motion vector group of the current decoding block according to the bitstream. In addition, target candidate blocks, of the current decoding block, corresponding to all motion vectors in the motion vector group have a same reference frame, and the reference frame is the reference frame of the current decoding block.

In this embodiment of the present application, the second determining module 420 determines the prediction values of the first component set of the motion model initialization vector of the current decoding block according to the at least one motion vector of the motion vector group. The motion model initialization vector includes the at least four components. The first component set includes at least one component of the motion model initialization vector. Specifically, an affine motion model is used as an example. The affine model may be represented by using six parameters, and the six parameters may be expressed as $\vec{A}=(a_0, a_1, a_2, a_3, a_4, a_5)^T$. A location, in a reference frame, of each pixel in the current decoding block may be determined according to formula (7), where x and y are coordinate values of any pixel in the current decoding block, x' and y' are coordinate values, at a corresponding prediction point in the reference frame, of the pixel, and $v_x$ and $v_y$ are motion vectors of any pixel in the current decoding block. Formula (8) may be obtained. According to the motion vector group determined in S210, the motion vector group may be expressed as $\{v_0, v_1, v_2\}$, and coordinates of the motion vectors in the motion vector group may be (0,0), (W,0), and (0,H), where W is a width of the current decoding block, and H is a height of the current decoding block. Formula (9) may be obtained by substituting the motion vector group and the coordinates into formula (8), where $v_{xj}$ is an x-directional component of the $j^{th}$ candidate motion vector v in a first candidate motion vector group, $v_{yj}$ is a y-directional component of the $j^{th}$ candidate motion vector $v_j$ in the first candidate motion vector group, and j=0, 1, 2. Correspondingly, all the parameters in the affine motion model $\vec{A}=(a_0, a_1, a_2, a_3, a_4, a_5)^T$ may be obtained. As shown in formula (6), the motion vector group of the current decoding block is substituted into formula (6), and the motion model initialization vector $\vec{A}=(a_0, a_1, a_2, a_3, a_4, a_5)^T$ of the current decoding block may be determined. The motion model initialization vector is a six-dimensional vector. Optionally, for another motion model, the initialization vector is a vector including at least four dimensions. The prediction values of the first component set may be determined according to the motion model initialization vector. The prediction values of the first component set may include at least one component of the motion model initialization vector.

In this embodiment of the present application, the third determining module 430 determines the motion model optimization vector of the current decoding block according to the prediction values of the first component set and the motion model transmission vector, so that the decoder side performs decoding according to the motion model optimization vector. Specifically, motion model transmission values of the current decoding block may be expressed as ($\Delta a_0$, $\Delta a_1$, $\Delta a_2$, $\Delta a_3$, $\Delta a_4$, $\Delta a_5$). Transmission values of the first component set may be represented by $\Delta a_0$ and $\Delta a_1$, $\Delta a_0 = a_0' - \bar{a}_0$, and $\Delta a_1 = a_1' - \bar{a}_1$, where $\bar{a}_0$ and $\bar{a}_1$ are numeric values obtained after prediction values $a_0$ and $a_1$ of the first component set are quantized. The other parameter transmission values of the current decoding block may be expressed as ($\Delta a_2$, $\Delta a_3$, $\Delta a_4$, $\Delta a_5'$)=($\Delta a_2'$, $\Delta a_3' \Delta a_4'$, $\Delta a_5'$), and $a_i'$ may be determined, where $a_i'$ is the motion model optimization vector of the current decoding block.

In this embodiment of the present application, the third determining module 430 may quantize the prediction values $a_0$ and $a_1$ of the first component set, to determine the quantized prediction values $\bar{a}_0$ and $\bar{a}_1$ of the first component set. Specifically, an affine motion is used as an example. The motion model initialization vector is determined according to formula (6). In the motion model initialization vector, $a_0$ and $a_1$ are translation motion parameters, and are related to the first motion vector $v_0$ in the motion vector group. $a_0$ and $a_1$ may be determined as the first component set. Optionally, a quantization precision of the two parameters may be 1/16 or 1/4. 1/16 is used as an example. First, $v_0$ is scaled up by four times, so that the precision of $v_0$ is increased from 1/4 to 1/16; and then, quantized $a_0$ and $a_1$ whose precision is also 1/16 are calculated by using $v_0$ whose precision is 1/16 to obtain $\bar{a}_0$ and $\bar{a}_1$, that is, $\bar{a}_0$ and $\bar{a}_1$ are the quantized prediction values of the first component set.

Optionally, in an embodiment, the third determining module 430 may determine the prediction values $a_i$ of the first component set of the motion model initialization vector according to formula (6). The first component set includes all components of the motion model initialization vector, that is, the first component set includes six parameters, so the motion model transmission values of the current decoding block are determined, that is, the transmission values of the first component set are ($\Delta a_0$, $\Delta a_1$, $\Delta a_2$, $\Delta a_3$, $\Delta a_4$, $\Delta a_5$), where $\Delta a_i = a_i' - a_i$, and $a_i'$ is the motion model optimization vector of the current decoding block.

In this embodiment of the present application, the third determining module 430 may determine a motion model quantization precision according to the current decoding block; quantize the motion model optimization vector according to the motion model quantization precision; and perform parsing, decoding and reconstruction on the current decoding block according to the quantized motion model optimization vector.

Specifically, the third determining module 430 determines the motion model quantization precision of the current decoding block. Specifically, the quantization precision may be determined according to a size of the current decoding block and precision information. The size of the current decoding block includes a width of the current decoding block and a height of the current decoding block, and the precision information includes a quantization precision of the motion vector group. Specifically, it can be learnt, according to formula (6), that parameters of the motion model are related to the width and the height of the current decoding block. Therefore, the quantization precision may be determined according to formula (10). 1/P is the quantization precision of the motion vector group of the current decoding block. Optionally, the quantization precision of the motion vector group is generally 1/4, so P=4. W is the width of the current decoding block, and H is the height of the current decoding block. For example, if the width of the current decoding block is 16 and the height is 32, the quantization precision of the motion vector group is 1/(32×4)=1/128; if the width of the current decoding block is 16 and the height is 8, the quantization precision is 1/(16×4)=1/64.

Specifically, in this embodiment of the present application, the third determining module 430 quantizes the determined motion model optimization vector according to the determined quantization precision, to obtain the quantized motion model optimization vector $\vec{A}=(\bar{a}_0', \bar{a}_1', \bar{a}_2', \bar{a}_3', \bar{a}_4', \bar{a}_5')^T$.

Specifically, in this embodiment of the present application, the third determining module 430 decodes the current decoding block according to the quantized motion model optimization vector. Specifically, the motion model optimization vector $\vec{A}=(\bar{a}_0', \bar{a}_1', \bar{a}_2', \bar{a}_3', \bar{a}_4', \bar{a}_5')^T$ is substituted into formula (7), and then a reference offset location (x', y') of each pixel with a precision Q in the current decoding block may be obtained. A prediction pixel sample of each pixel sample in the current decoding block is obtained through calculation in the reference offset location. Then, decoding and reconstruction are performed on the prediction pixel sample according to a determined prediction residual, in a received bitstream, of the current decoding block. Optionally, the pixel sample may be one pixel or a small pixel block including multiple pixels. The present application is not limited thereto.

It should be understood that the decoding device 400 according to this embodiment of the present application may be correspondingly configured to execute the video image decoding method 200 in the embodiment of the present application. In addition, the foregoing and other operations and/or functions of the modules in the decoding device 400 are intended to implement corresponding processes of the methods in FIG. 3 and FIG. 4. For brevity, details are not further described herein.

Therefore, the decoding device in this embodiment of the present application determines a motion vector group and a motion model transmission vector of a current decoding block according to a received bitstream; determines a motion model initialization vector of the current decoding block according to the motion vector group; determines a motion model optimization vector according to the motion model initialization vector and the motion model transmission vector; and decodes and reconstructs the motion model optimization vector. In this way, a volume of data and a quantity of occupied bits in encoding and decoding transmission can be reduced. In addition, when the motion model optimization vector is determined and the optimization vector is quantized, a determined quantization precision is determined according to a size of the current decoding block and a quantization precision of a motion vector of the current decoding block. This can also reduce a quantity of bits required in parameter transmission.

Figure 7:
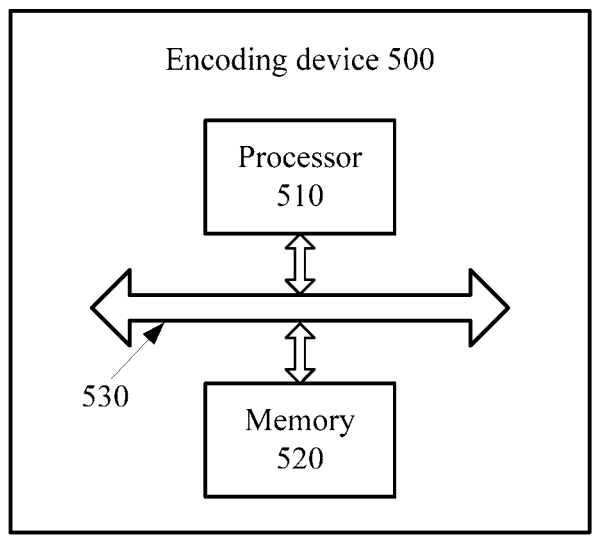
FIG. 7 is another schematic block diagram of an encoding device according to an embodiment of the present application.

As shown in FIG. 7, an embodiment of the present application further provides an encoding device 500, including a processor 510, a memory 520, and a bus system 530. The processor 510 and the memory 520 are connected by using the bus system 530. The memory 520 is configured to store an instruction. The processor 510 is configured to execute the instruction stored in the memory 520. The memory 520 of the encoding device 500 stores program code, and the processor 510 may call the program code stored in the memory 520 to perform the following operations: determining a motion vector group of a current encoding block, where the motion vector group includes at least one motion vector of the current encoding block; determining prediction values of a first component set of a motion model initialization vector of the current encoding block according to the at least one motion vector of the motion vector group, where the motion model initialization vector includes at least four components; determining to-be-transmitted values of the first component set according to the prediction values of the first component set; and encoding the to-be-transmitted values of the first component set, and transmitting encoded to-be-transmitted values of the first component set to a decoder side.

Therefore, the encoding device in this embodiment of the present application determines a motion vector group of a current encoding block; determines a motion model initialization vector of the current encoding block according to the motion vector group; determines to-be-transmitted values of a motion model according to the motion model initialization vector; and encodes the to-be-transmitted values of the motion model for transmission, so that a decoder side performs decoding according to the to-be-transmitted values of the motion model. In this way, a volume of data and a quantity of occupied bits in encoding and decoding transmission can be reduced.

It should be understood that, in this embodiment of the present application, the processor 510 may be a central processing unit (CPU), or the processor 510 may be another general-purpose processor, a digital signal processor (DSP), an application-specific integrated circuit (ASIC), a field programmable gate array (FPGA) or another programmable logic device, a discrete gate or transistor logical device, a discrete hardware assembly, or the like. The general-purpose processor may be a microprocessor, or the processor may be any conventional processor or the like.

The memory 520 may include a read-only memory and a random access memory, and provide instructions and data for the processor 510. A part of the memory 520 may further include a non-volatile random access memory. For example, the memory 520 may further store device type information.

In addition to a data bus, the bus system 530 may further include a power supply bus, a control bus, a status signal bus, and the like. However, for clear description, various buses are represented by the bus system 530 in the figure.

In an implementation process, steps of the foregoing methods may be implemented by using an integrated logic circuit of hardware in the processor 510 or by using an instruction in a form of software. The steps of the methods disclosed with reference to the embodiments of the present application may be directly implemented by a hardware processor, or may be implemented by a combination of hardware and a software module in a processor. The software module may be located in a mature storage medium in the art, such as a random access memory, a flash memory, a read-only memory, a programmable read-only memory, an electrically-erasable programmable memory, or a register. The storage medium is located in the memory 520, and the processor 510 reads information from the memory 520 and implements the steps in the foregoing methods in combination with hardware of the processor 501. To avoid repetition, details are not further described herein.

Optionally, in an embodiment, the processor 510 may call the program code stored in the memory 520 to perform the following operations: determining a motion model optimization vector of the current encoding block; and determining to-be-transmitted values of the first component set according to the prediction values of the first component set and the motion model optimization vector.

Optionally, in an embodiment, the processor 510 may call the program code stored in the memory 520 to perform the following operations: determining a motion model quantization precision according to a size of the current encoding block and precision information; quantizing the motion model optimization vector according to the motion model quantization precision; and determining the to-be-transmitted values of the first component set according to the prediction values of the first component set and a quantized motion model optimization vector.

Optionally, in an embodiment, the size of the current encoding block includes a width of the current encoding block and a height of the current encoding block, and the precision information includes a quantization precision of the motion vector group. The processor 510 may call the program code stored in the memory 520 to perform the following operation: determining a motion model quantization precision Q according to formula (10), where P is the quantization precision of the motion vector group, W is the width of the current encoding block, and H is the height of the current encoding block.

Optionally, in an embodiment, the first component set includes at least one component of six components of the motion model initialization vector, and the processor 510 may call the program code stored in the memory 520 to perform the following operation: determining the six components $a_i$ of the motion model initialization vector according to formula (6), where i=0, 1, 2, 3, 4, 5, W is the width of the current encoding block, H is the height of the current encoding block, $v_{xj}$ is an x-directional component of the motion vector $v_j$, $v_{yj}$ is a y-directional component of the motion vector $v_j$, and j=0, 1, 2.

Optionally, in an embodiment, the first component set includes two components of the motion model initialization vector, and the processor 510 may call the program code stored in the memory 520 to perform the following operation: determining the to-be-transmitted values of the first component set, where the to-be-transmitted values of the first component set include $\Delta a_0$ and $\Delta a_1$, $\Delta a_0 = \bar{a}_0' - \bar{a}_0$, $\Delta a_1 = \bar{a}_1' - \bar{a}_1$, $\bar{a}_0'$ and $\bar{a}_1'$ are quantized motion model optimization vectors corresponding to the first component set, and $\bar{a}_0$ and $\bar{a}_1$ are numeric values obtained after prediction values $a_0$ and $a_1$ of the first component set are quantized.

Optionally, in an embodiment, the first component set includes the six components of the motion model initialization vector, and the processor 510 may call the program code stored in the memory 520 to perform the following operation: determining the to-be-transmitted values of the first component set, where the to-be-transmitted values of the first component set include $\Delta a_i$, and i=0, 1, 2, 3, 4, 5, where $\Delta a_i = \bar{a}_i' - a_i$, $\bar{a}_i'$ is the quantized motion model optimization vector, and $a_i$ is the prediction value of the first component set.

Optionally, in an embodiment, the processor 510 may call the program code stored in the memory 520 to perform the following operations: determining multiple candidate blocks of the current encoding block, where each candidate block of the multiple candidate blocks is an encoded block adjacent to the current encoding block; determining a matching error value between a prediction block corresponding to a motion vector of each candidate block of the multiple candidate blocks and the current encoding block; determining, as a target candidate block of the current encoding block, a candidate block corresponding to a smallest matching error value in multiple matching error values corresponding to the multiple candidate blocks; obtaining a picture order count of a reference frame of the current encoding block and a picture order count of a reference frame of the target candidate block; determining a first motion vector in the motion vector group according to a ratio of the picture order count of the reference frame of the current encoding block to the picture order count of the reference frame of the target candidate block, where a ratio of the first motion vector to a motion vector of the target candidate block is the same as the ratio of the picture order count of the reference frame of the current encoding block to the picture order count of the reference frame of the target candidate block; and determining the motion vector group according to the first motion vector.

Optionally, in an embodiment, the processor 510 may call the program code stored in the memory 520 to perform the following operations: determining multiple candidate blocks corresponding to a same pixel in the current encoding block, where each candidate block of the multiple candidate blocks is an encoded block adjacent to the current encoding block; determining a matching error value between a prediction block corresponding to a motion vector of each candidate block of the multiple candidate blocks and the current encoding block; determining, as a target candidate block of the current encoding block, a candidate block corresponding to a smallest matching error value in multiple matching error values corresponding to the multiple candidate blocks; determining a motion vector of the target candidate block as a first motion vector in the motion vector group; determining a second motion vector in the motion vector group according to the first motion vector; and determining the motion vector group according to the first motion vector and the second motion vector.

Optionally, in an embodiment, the processor 510 may call the program code stored in the memory 520 to perform the following operations: determining multiple candidate motion vector groups of the current encoding block, where each candidate motion vector group of the multiple candidate motion vector groups includes three candidate motion vectors; determining a candidate reference frame corresponding to each candidate motion vector group of the multiple candidate motion vector groups; for each candidate motion vector group, determining coordinate values of each pixel, at a corresponding prediction point in the candidate reference frame, in the current encoding block; for each candidate motion vector group, determining a matching error value of the current encoding block according to coordinate values of each pixel in the current encoding block and the coordinate values of each pixel, at the corresponding prediction point in the candidate reference frame, in the current encoding block; and determining, as the motion vector group of the current encoding block, the candidate motion vector group corresponding to a smallest matching error value of the current encoding block. Optionally, in an embodiment, the processor 510 may call the program code stored in the memory 520 to perform the following operations: determining a first prediction block of the current encoding block according to the motion model initialization vector; determining a first matching error value between the current encoding block and the first prediction block; determining, from multiple prediction blocks included in the reference frame of the current encoding block, a second prediction block with a smallest matching error value relative to the current encoding block; determining a second matching error value between the current encoding block and the second prediction block; and determining the motion model optimization vector of the current encoding block according to the first matching error value and the second matching error value.

Optionally, in an embodiment, the processor 510 may call the program code stored in the memory 520 to perform the following operation: when the first matching error value is less than the second matching error value, determining the motion model initialization vector as the motion model optimization vector; or when the first matching error value is greater than the second matching error value, determining the motion model optimization vector according to a pixel of the second prediction block and a pixel of the current encoding block.

It should be understood that the encoding device 500 according to this embodiment of the present application may be corresponding to the encoding device 300 in the embodiment of the present application, and may be corresponding to a corresponding body that executes the method 100 in the embodiment of the present application. In addition, the foregoing and other operations and/or functions of the modules in the encoding device 500 are intended to implement corresponding processes of the methods in FIG. 1 and FIG. 2. For brevity, details are not further described herein.

Therefore, the encoding device in this embodiment of the present application determines a motion vector group of a current encoding block; determines a motion model initialization vector of the current encoding block according to the motion vector group; determines to-be-transmitted values of a motion model according to the motion model initialization vector; and encodes the to-be-transmitted values of the motion model for transmission, so that a decoder side performs decoding according to the to-be-transmitted values of the motion model. In this way, a volume of data and a quantity of occupied bits in encoding and decoding transmission can be reduced. In addition, when the motion model optimization vector is determined and the optimization vector is quantized, a determined quantization precision is determined according to a size of the current encoding block and a quantization precision of a motion vector of the current encoding block. This can also reduce a quantity of bits required by an encoding parameter.

Figure 8:
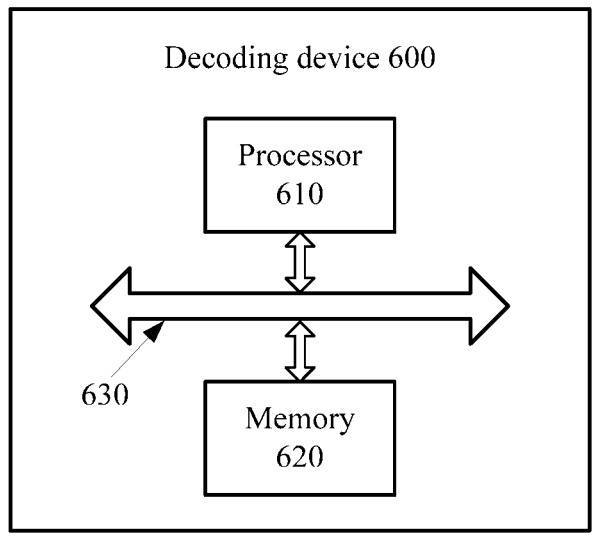
FIG. 8 is another schematic block diagram of a decoding device according to an embodiment of the present application.

As shown in FIG. 8, an embodiment of the present application further provides a decoding device 600, including a processor 610, a memory 620, and a bus system 630. The processor 610 and the memory 620 are connected by using the bus system 630. The memory 620 is configured to store an instruction. The processor 610 is configured to execute the instruction stored in the memory 620. The memory 620 of the decoding device 600 stores program code, and the processor 610 may call the program code stored in the memory 620 to perform the following operations: determining a motion vector group and a motion model transmission vector of a current decoding block according to a bitstream, where the motion vector group includes at least one motion vector of the current decoding block, and the motion model transmission vector includes at least four components; determining prediction values of a first component set of a motion model initialization vector of the current decoding block according to the at least one motion vector of the motion vector group, where the motion model initialization vector includes at least four components; and determining a motion model optimization vector of the current decoding block according to the prediction values of the first component set and the motion model transmission vector, so as to decode the current decoding block according to the motion model optimization vector.

Therefore, the decoding device in this embodiment of the present application determines a motion vector group and a motion model transmission vector of a current decoding block according to a received bitstream; determines a motion model initialization vector of the current decoding block according to the motion vector group; determines a motion model optimization vector according to the motion model initialization vector and the motion model transmission vector; and decodes and reconstructs the motion model optimization vector. In this way, a volume of data and a quantity of occupied bits in encoding and decoding transmission can be reduced.

It should be understood that, in this embodiment of the present application, the processor 610 may be a central processing unit (CPU), or the processor 610 may be another general-purpose processor, a digital signal processor (DSP), an application-specific integrated circuit (ASIC), a field programmable gate array (FPGA) or another programmable logic device, a discrete gate or transistor logical device, a discrete hardware assembly, or the like. The general-purpose processor may be a microprocessor, or the processor may be any conventional processor or the like.

The memory 620 may include a read-only memory and a random access memory, and provide instructions and data for the processor 610. A part of the memory 620 may further include a non-volatile random access memory. For example, the memory 620 may further store device type information.

In addition to a data bus, the bus system 630 may further include a power supply bus, a control bus, a status signal bus, and the like. However, for clear description, various buses are represented by the bus system 630 in the figure.

In an implementation process, steps of the foregoing methods may be implemented by using an integrated logic circuit of hardware in the processor 610 or by using an instruction in a form of software. The steps of the methods disclosed with reference to the embodiments of the present application may be directly implemented by a hardware processor, or may be implemented by a combination of hardware and a software module in a processor. The software module may be located in a mature storage medium in the art, such as a random access memory, a flash memory, a read-only memory, a programmable read-only memory, an electrically-erasable programmable memory, or a register. The storage medium is located in the memory 620, and the processor 610 reads information from the memory 620 and implements the steps in the foregoing methods in combination with hardware of the processor 610. To avoid repetition, details are not further described herein.

Optionally, in an embodiment, the processor 610 may call the program code stored in the memory 620 to perform the following operations: determining a motion model quantization precision of the current decoding block; quantizing the motion model optimization vector according to the motion model quantization precision; and decoding the current decoding block according to a quantized motion model optimization vector.

Optionally, in an embodiment, the processor 610 may call the program code stored in the memory 620 to perform the following operation: determining the motion model quantization precision according to a size of the current decoding block and precision information.

Optionally, in an embodiment, the size of the current decoding block includes a width of the current decoding block and a height of the current decoding block, and the precision information includes a quantization precision of the motion vector group. The processor 610 may call the program code stored in the memory 620 to perform the following operation: determining a motion model quantization precision Q according to formula (10), where P is the quantization precision of the motion vector group, W is the width of the current decoding block, and H is the height of the current decoding block.

Optionally, in an embodiment, the first component set includes at least one component of six components of the motion model initialization vector, and the processor 610 may call the program code stored in the memory 620 to perform the following operation: determining the six components $a_i$ of the motion model initialization vector according to formula (6), where i=0, 1, 2, 3, 4, 5, W is the width of the current decoding block, H is the height of the current decoding block, $v_{xj}$ is an x-directional component of the motion vector $v_j$, $v_{yj}$ is a y-directional component of the motion vector $v_j$, and j=0, 1, 2.

Optionally, in an embodiment, the first component set includes two components of the motion model initialization vector, and the processor 610 may call the program code stored in the memory 620 to perform the following operation: determining that the motion model optimization vector of the current decoding block is $(a_0', a_1', a_2', a_3', a_4', a_5')$, $(\Delta a_0, \Delta a_1)=(a_0', a_1')-(\overline{a}_0, \overline{a}_1)$, and $(\Delta a_2, \Delta a_3, \Delta a_4, \Delta a_5)=(\Delta a_2', \Delta a_3' \Delta a_4', \Delta a_5')$, where $\Delta a_i$ is the motion model transmission vector, $\overline{a}_0$ and $\overline{a}_1$ are numeric values obtained by quantizing prediction values $a_0$ and $a_1$ of the first component set.

Optionally, in an embodiment, the first component set includes the six components of the motion model initialization vector, and the processor 610 may call the program code stored in the memory 620 to perform the following operation: determining that the motion model optimization vector of the current decoding block is $(a_0', a_1', a_2', a_3', a_4', a_5')$, where $\Delta a_i=a_i'-a_i$, $\Delta a_i$ is the motion model transmission vector, $a_i$ is the prediction value of the first component set, and i=0, 1, 2, 3, 4, 5.

Optionally, in an embodiment, the processor 610 may call the program code stored in the memory 620 to perform the following operations: determining a target candidate block of the current decoding block and a motion vector of the target candidate block according to the bitstream; obtaining a picture order count of a reference frame of the current decoding block and a picture order count of a reference frame of the target candidate block; determining a first motion vector in the motion vector group according to a ratio of the picture order count of the reference frame of the current decoding block to the picture order count of the reference frame of the target candidate block, where a ratio of the first motion vector to the motion vector of the target candidate block is the same as the ratio of the picture order count of the reference frame of the current decoding block to the picture order count of the reference frame of the target candidate block; and determining the motion vector group according to the first motion vector.

Optionally, in an embodiment, the processor 610 may call the program code stored in the memory 620 to perform the following operations: determining the motion vector of the target candidate block of the current decoding block according to the bitstream; determining the motion vector of the target candidate block of the current decoding block as the first motion vector in the motion vector group; determining a second motion vector in the motion vector group according to the first motion vector; and determining the motion vector group according to the first motion vector and the second motion vector.

It should be understood that the decoding device 600 according to this embodiment of the present application may be corresponding to the decoding device 400 in the embodiment of the present application, and may be corresponding to a corresponding body that executes the method 200 in the embodiment of the present application. In addition, the foregoing and other operations and/or functions of the modules in the decoding device 600 are intended to implement corresponding processes of the methods in FIG. 3 and FIG. 4. For brevity, details are not further described herein.

Therefore, the decoding device in this embodiment of the present application determines a motion vector group and a motion model transmission vector of a current decoding block according to a received bitstream; determines a motion model initialization vector of the current decoding block according to the motion vector group; determines a motion model optimization vector according to the motion model initialization vector and the motion model transmission vector; and decodes and reconstructs the motion model optimization vector. In this way, a volume of data and a quantity of occupied bits in encoding and decoding transmission can be reduced. In addition, when the motion model optimization vector is determined and the optimization vector is quantized, a determined quantization precision is determined according to a size of the current decoding block and a quantization precision of a motion vector of the current decoding block. This can also reduce a quantity of bits required in parameter transmission.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not further described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electronic, mechanical, or other forms.

The units described as separate parts may or may not be physically separate. Parts displayed as units may or may not be physical units, and may be located in one position or may be distributed on multiple network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the conventional art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A video image decoding method comprising
determining a motion vector group and a motion model transmission vector of a current decoding block according to a bitstream, wherein the motion vector group comprises at least one motion vector of the current decoding block, and the motion model transmission vector comprises at least four components;
determining prediction values of a first component set of a motion model initialization vector of the current decoding block according to the at least one motion vector of the motion vector group, wherein the motion model initialization vector comprises at least four components; and
determining a motion model optimization vector of the current decoding block according to the prediction values of the first component set and the motion model transmission vector, so as to decode the current decoding block according to the motion model optimization vector.

2. The method according to claim 1 further comprising:
determining a motion model quantization precision of the current decoding block;
quantizing the motion model optimization vector according to the motion model quantization precision; and
decoding the current decoding block according to a quantized motion model optimization vector.

3. The method according to claim 2, wherein determining the motion model quantization precision of the current decoding block comprises:
determining the motion model quantization precision according to a size of the current decoding block and precision information.

4. The method according to claim 3, wherein the size of the current decoding block comprises a width of the current decoding block and a height of the current decoding block, and the precision information comprises a quantization precision of the motion vector group; and
wherein determining the motion model quantization precision according to the size of the current decoding block and the precision information comprises:
determining the motion model quantization precision Q according to the following formula:

$$Q=1/(S \times P), S=\max(W,H)$$

wherein P is the quantization precision of the motion vector group, W is the width of the current decoding block, and H is the height of the current decoding block.

5. The method according to claim 2, wherein the motion model initialization vector, the motion model transmission vector, and the motion model optimization vector each comprise six components, the motion vector group comprises three motion vectors, and the three motion vectors are in a one-to-one correspondence to three pixels in the current decoding block.

6. The method according to claim 5, wherein the first component set comprises at least one component of the six components of the motion model initialization vector, and the six components $a_i$ of the motion model initialization vector are determined according to the following formulas:

$$a_0 = -v_{x0}$$

$$a_1 = -v_{y0}$$

$$a_2 = \frac{W - (v_{x1} - v_{y0})}{W}$$

$$a_3 = \frac{v_{y0} - v_{y1}}{W}$$

$$a_4 = \frac{v_{x0} - v_{x2}}{H}$$

$$a_5 = \frac{H - v_{y0} + v_{y2}}{H}$$

wherein i=0, 1, 2, 3, 4, 5, W is the width of the current decoding block, H is the height of the current decoding block, $v_{xj}$ is an x-directional component of the motion vector $v_j$, $v_{yj}$ is a y-directional component of the motion vector $v_j$, and j=0, 1, 2.

7. The method according to claim 6, wherein the first component set comprises two components of the motion model initialization vector; and
wherein determining the motion model optimization vector of the current decoding block according to the prediction values of the first component set and the motion model transmission vector comprises:
determining that the motion model optimization vector of the current decoding block is ($a_0'$, $a_1'$, $a_2'$, $a_3'$, $a_4'$, $a_5'$), where ($\Delta a_0$, $\Delta a_1$)=($a_0'$, $a_1'$)−($\bar{a}_0$, $\bar{a}_1$), ($\Delta a_2$, $\Delta a_3$, $\Delta a_4$, $\Delta a_5$)=($a_2'$, $a_3'$, $a_4'$, $a_5'$), $\Delta a_i$ is the motion model transmission vector, and $\bar{a}_0$ and $\bar{a}_1$ are numeric values obtained after prediction values $a_0$ and $a_1$ of the first component set are quantized.

8. The method according to claim 6, wherein the first component set comprises the six components of the motion model initialization vector; and
wherein the method further comprises:
determining that the motion model optimization vector of the current decoding block is ($a_0'$, $a_1'$, $a_2'$, $a_3'$, $a_4'$, $a_5'$), wherein $\Delta a_i=a_i'-a_i$, $\Delta a_i$ is the motion model transmission vector, $a_i$ is the prediction value of the first component set, and i=0, 1, 2, 3, 4, 5.

9. The method according to claim 1, wherein determining the motion vector group and the motion model transmission vector of the current decoding block comprises:
determining a target candidate block of the current decoding block and a motion vector of the target candidate block according to the bitstream;
obtaining a picture order count of a reference frame of the current decoding block and a picture order count of a reference frame of the target candidate block;
determining a first motion vector in the motion vector group according to a ratio of the picture order count of the reference frame of the current decoding block to the picture order count of the reference frame of the target candidate block, wherein a ratio of the first motion vector to the motion vector of the target candidate block is the same as the ratio of the picture order count of the reference frame of the current decoding block to the picture order count of the reference frame of the target candidate block; and
determining the motion vector group according to the first motion vector.

10. The method according to claim 1, wherein determining the motion vector group and the motion model transmission vector of the current decoding block according to the bitstream comprises:
determining a motion vector of a target candidate block of the current decoding block according to the bitstream;
determining the motion vector of the target candidate block of the current decoding block as a first motion vector in the motion vector group;
determining a second motion vector in the motion vector group according to the first motion vector; and
determining the motion vector group according to the first motion vector and the second motion vector.

11. A decoding device for video image decoding comprising:
a processor, and
a memory coupled to the processor and storing processor-executable instructions which when executed causes the processor to implement operations including:
determining a motion vector group and a motion model transmission vector of a current decoding block according to a bitstream, wherein the motion vector group comprises at least one motion vector of the current decoding block, and the motion model transmission vector comprises at least four components;
determining prediction values of a first component set of a motion model initialization vector of the current decoding block according to the at least one motion vector of the motion vector group, wherein the motion model initialization vector comprises at least four components; and
determining a motion model optimization vector of the current decoding block according to the prediction values of the first component set and the motion model transmission vector, so as to decode the current decoding block according to the motion model optimization vector.

12. The decoding device according to claim 11, wherein the operations include:
   determining a motion model quantization precision of the current decoding block;
   quantizing the motion model optimization vector according to the motion model quantization precision; and
   decoding the current decoding block according to a quantized motion model optimization vector.

13. The decoding device according to claim 12, wherein the operations include:
   determining the motion model quantization precision according to a size of the current decoding block and precision information.

14. The decoding device according to claim 13, wherein the size of the current decoding block comprises a width of the current decoding block and a height of the current decoding block, and the precision information comprises a quantization precision of the motion vector group; and
   wherein the operations include:
   determining the motion model quantization precision Q according to the following formula:

$Q=1/(S \times P), S=\max(W,H)$ wherein P is the quantization precision of the motion vector group, W is the width of the current decoding block, and H is the height of the current decoding block.

15. The decoding device according to claim 12, wherein the motion model initialization vector, the motion model transmission vector, and the motion model optimization vector each comprise six components, the motion vector group comprises three motion vectors, and the three motion vectors are in a one-to-one correspondence to three pixels in the current decoding block.

16. The decoding device according to claim 15, wherein the first component set comprises at least one component of the six components of the motion model initialization vector, and wherein the operations include:
   determining the six components $a_i$ of the motion model initialization vector according to the following formulas:

$$a_0 = -v_{x0}$$
   $$a_1 = -v_{y0}$$
   $$a_2 = \frac{W - (v_{x1} - v_{y0})}{W}$$
   $$a_3 = \frac{v_{y0} - v_{y1}}{W}$$
   $$a_4 = \frac{v_{x0} - v_{x2}}{H}$$
   $$a_5 = \frac{H - v_{y0} + v_{y2}}{H}$$

wherein i=0, 1, 2, 3, 4, 5, W is the width of the current decoding block, H is the height of the current decoding block, $v_{xj}$ is an x-directional component of the motion vector $v_j$, $v_{yj}$ is a y-directional component of the motion vector $v_j$, and j=0, 1, 2.

17. The decoding device according to claim 16, wherein the first component set comprises two components of the motion model initialization vector; and
   wherein the operations include:
   determining that the motion model optimization vector of the current decoding block is $(a_0', a_1', a_2', a_3', a_4', a_5')$, wherein $(\Delta a_0, \Delta a_1)=(a_0', a_1')-(\bar{a}_0, \bar{a}_1)$, $(\Delta a_2, \Delta a_3, \Delta a_4, \Delta a_5)=(a_2', a_3', a_4', a_5')$, $\Delta a_i$ is the motion model transmission vector, and $\bar{a}_0$ and $\bar{a}_1$ are numeric values obtained after prediction values $a_0$ and $a_1$ of the first component set are quantized.

18. The decoding device according to claim 16, wherein the first component set comprises the six components of the motion model initialization vector; and
   wherein operations include:
   determining that the motion model optimization vector of the current decoding block is $(a_0', a_2', a_3', a_4', a_5')$, wherein $\Delta a_i=a_i'-a_i$, $\Delta a_i$ is the motion model transmission vector, $a_i$ is the prediction value of the first component set, and i=0, 1, 2, 3, 4, 5.

19. The decoding device according to claim 11, wherein the operations include:
   determining a target candidate block of the current decoding block and a motion vector of the target candidate block according to the bitstream;
   obtaining a picture order count of a reference frame of the current decoding block and a picture order count of a reference frame of the target candidate block;
   determining a first motion vector in the motion vector group according to a ratio of the picture order count of the reference frame of the current decoding block to the picture order count of the reference frame of the target candidate block, wherein a ratio of the first motion vector to the motion vector of the target candidate block is the same as the ratio of the picture order count of the reference frame of the current decoding block to the picture order count of the reference frame of the target candidate block; and
   determining the motion vector group according to the first motion vector.

20. The decoding device according to claim 11, wherein the operations include:
   determining a motion vector of a target candidate block of the current decoding block according to the bitstream;
   determining the motion vector of the target candidate block of the current decoding block as a first motion vector in the motion vector group;
   determining a second motion vector in the motion vector group according to the first motion vector; and
   determining the motion vector group according to the first motion vector and the second motion vector.

* * * * *

UNITED STATES PATENT AND TRADEMARK OFFICE
CERTIFICATE OF CORRECTION

PATENT NO. : 10,349,079 B2
APPLICATION NO. : 15/678635
DATED : July 9, 2019
INVENTOR(S) : Lin et al.

Page 1 of 1

It is certified that error appears in the above-identified patent and that said Letters Patent is hereby corrected as shown below:

In the Claims

Claim 18, Column 56, Line 19 "wherein operations include:" should read -- wherein the operations include: --.

Signed and Sealed this
Eighteenth Day of February, 2020

Andrei Iancu
*Director of the United States Patent and Trademark Office*